United States Patent
Karunamuni et al.

(10) Patent No.: US 11,562,325 B2
(45) Date of Patent: *Jan. 24, 2023

(54) INTELLIGENT PRESENTATION OF DOCUMENTS

(71) Applicant: Apple Inc., Cupertino, CA (US)

(72) Inventors: Chanaka G. Karunamuni, San Jose, CA (US); Marcel Van Os, San Francisco, CA (US); Scott Herz, San Jose, CA (US); Eliza Block, San Francisco, CA (US); Glen W. Steele, San Jose, CA (US); Ken Ferry, Mountain View, CA (US); Peter Laurens, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,024

(22) Filed: Jun. 6, 2019

(65) Prior Publication Data

US 2019/0286694 A1    Sep. 19, 2019

Related U.S. Application Data

(63) Continuation of application No. 13/843,962, filed on Mar. 15, 2013, now Pat. No. 10,354,004.

(Continued)

(51) Int. Cl.
*G06Q 10/10* (2012.01)
*G06F 16/48* (2019.01)
(Continued)

(52) U.S. Cl.
CPC ............ *G06Q 10/10* (2013.01); *G06F 16/48* (2019.01); *G06F 16/487* (2019.01); *G06F 16/489* (2019.01); *G06Q 10/00* (2013.01)

(58) Field of Classification Search
CPC ...... G06F 16/487; G06F 16/489; G06F 40/20; G06F 16/48; G06Q 10/10; G06Q 10/00
See application file for complete search history.

(56) References Cited

U.S. PATENT DOCUMENTS

| 4,143,810 A | 3/1979 | Greenaway |
| 5,379,057 A | 1/1995 | Clough et al. |
| (Continued) | | |

FOREIGN PATENT DOCUMENTS

| CN | 1254139 A | 5/2000 |
| CN | 1405728 A | 3/2003 |
| (Continued) | | |

OTHER PUBLICATIONS

Corrected Notice of Allowance received for U.S. Appl. No. 13/843,962, dated Jun. 10, 2019, 3 pages.

(Continued)

*Primary Examiner* — Chau T Nguyen
(74) *Attorney, Agent, or Firm* — Kubota & Basol LLP

(57) ABSTRACT

In some implementations, documents can be presented on a display of a computing device based on a context of the computing device. The context can include a current time and/or current location associated with the computing device. The documents can be presented based on a time and/or location associated with the documents. Documents can be downloaded and shared between devices. Documents can be dynamically updated based on document vendor provided information and/or other network based resources. In some implementations, the various graphical interfaces described herein provide access to a variety of document types in an organized and efficient manner.

42 Claims, 24 Drawing Sheets

Related U.S. Application Data

(60) Provisional application No. 61/656,931, filed on Jun. 7, 2012.

(51) Int. Cl.
 *G06F 16/487* (2019.01)
 *G06Q 10/00* (2012.01)

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,579,472 A | 11/1996 | Keyworth et al. |
| 5,675,362 A | 10/1997 | Clough et al. |
| 5,825,352 A | 10/1998 | Bisset et al. |
| 5,835,079 A | 11/1998 | Shieh |
| 5,880,411 A | 3/1999 | Gillespie et al. |
| 5,963,964 A | 10/1999 | Nielsen |
| 6,084,951 A | 7/2000 | Smith et al. |
| 6,091,956 A | 7/2000 | Hollenberg |
| 6,188,391 B1 | 2/2001 | Seely et al. |
| 6,202,055 B1 | 3/2001 | Houvener et al. |
| 6,310,610 B1 | 10/2001 | Beaton et al. |
| 6,323,846 B1 | 11/2001 | Westerman et al. |
| 6,333,973 B1 | 12/2001 | Smith et al. |
| 6,414,696 B1 | 7/2002 | Ellenby et al. |
| 6,456,307 B1 | 9/2002 | Bates et al. |
| 6,570,557 B1 | 5/2003 | Westerman et al. |
| 6,633,315 B1 | 10/2003 | Sobeski et al. |
| 6,668,177 B2 | 12/2003 | Salmimaa et al. |
| 6,677,932 B1 | 1/2004 | Westerman |
| 6,690,387 B2 | 2/2004 | Zimmerman et al. |
| 6,736,322 B2 | 5/2004 | Gobburu et al. |
| 6,791,583 B2 | 9/2004 | Tang et al. |
| 6,871,214 B2 | 3/2005 | Parsons et al. |
| 6,895,552 B1 | 5/2005 | Balabanovic et al. |
| 6,934,911 B2 | 8/2005 | Salmimaa et al. |
| 6,992,687 B1 | 1/2006 | Baird et al. |
| 7,015,894 B2 | 3/2006 | Morohoshi |
| 7,184,064 B2 | 2/2007 | Zimmerman et al. |
| 7,212,808 B2 | 5/2007 | Engstrom et al. |
| 7,213,206 B2 | 5/2007 | Fogg |
| 7,218,943 B2 | 5/2007 | Klassen et al. |
| 7,283,839 B2 | 10/2007 | You et al. |
| 7,310,534 B2 | 12/2007 | Northcutt |
| 7,346,850 B2 | 3/2008 | Swartz et al. |
| 7,360,172 B2 | 4/2008 | Grossman et al. |
| 7,433,920 B2 | 10/2008 | Blagsvedt et al. |
| 7,540,415 B2 | 6/2009 | Frank et al. |
| 7,552,094 B2 | 6/2009 | Park et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,685,530 B2 | 3/2010 | Sherrard et al. |
| 7,827,059 B2 | 11/2010 | Arning |
| 7,827,507 B2 | 11/2010 | Geise et al. |
| 7,844,914 B2 | 11/2010 | Andre et al. |
| 7,913,192 B2 | 3/2011 | Dicke et al. |
| 7,957,762 B2 | 6/2011 | Herz et al. |
| 7,974,391 B2 | 7/2011 | Drewry et al. |
| 8,006,002 B2 | 8/2011 | Kalayjian et al. |
| 8,014,792 B2 | 9/2011 | Sato et al. |
| 8,024,361 B2 | 9/2011 | Daughtry et al. |
| 8,140,093 B2 | 3/2012 | Zaffino |
| 8,190,692 B1 | 5/2012 | Zilka |
| 8,233,885 B2 | 7/2012 | Kansal et al. |
| 8,239,784 B2 | 8/2012 | Hotelling et al. |
| 8,279,180 B2 | 10/2012 | Hotelling et al. |
| 8,280,405 B2 | 10/2012 | Sanz-Pastor et al. |
| 8,320,528 B2 | 11/2012 | Diroo et al. |
| 8,320,547 B2 | 11/2012 | Cho et al. |
| 8,381,135 B2 | 2/2013 | Hotelling et al. |
| 8,468,054 B1 | 6/2013 | Espinoza et al. |
| 8,479,122 B2 | 7/2013 | Hotelling et al. |
| 8,560,943 B2 | 10/2013 | Chen et al. |
| 8,725,712 B2 | 5/2014 | Arrasvuori |
| 8,825,081 B2 | 9/2014 | Arrasvuori et al. |
| 8,827,153 B1 | 9/2014 | Rhoades et al. |
| 8,909,248 B2 | 12/2014 | Phillips et al. |
| 9,329,052 B2 | 5/2016 | Varanasi et al. |
| 9,348,458 B2 | 5/2016 | Hotelling et al. |
| 9,575,556 B2 | 2/2017 | Rekimoto |
| 9,582,937 B2 * | 2/2017 | Anttila .................. G06T 19/006 |
| 9,933,937 B2 | 4/2018 | Lemay et al. |
| 10,032,100 B2 | 7/2018 | Mullen et al. |
| 10,102,300 B2 | 10/2018 | Lemay et al. |
| 10,223,631 B2 | 3/2019 | Mullen et al. |
| 10,255,545 B2 | 4/2019 | Mullen et al. |
| 11,182,767 B1 * | 11/2021 | Mateer ............... G06Q 20/3223 |
| 2001/0017584 A1 | 8/2001 | Shinzaki |
| 2002/0015024 A1 | 2/2002 | Westerman et al. |
| 2002/0060246 A1 | 5/2002 | Gobburu et al. |
| 2002/0115476 A1 | 8/2002 | Padawer et al. |
| 2002/0165009 A1 | 11/2002 | Nohara et al. |
| 2003/0023858 A1 | 1/2003 | Banerjee et al. |
| 2003/0034185 A1 | 2/2003 | Kaikuranta |
| 2003/0064756 A1 | 4/2003 | Nielsen et al. |
| 2003/0215114 A1 | 11/2003 | Kyle |
| 2004/0137884 A1 | 7/2004 | Engstrom et al. |
| 2004/0172586 A1 | 9/2004 | Ragnet et al. |
| 2004/0259536 A1 | 12/2004 | Keskar et al. |
| 2005/0078177 A1 | 4/2005 | Gotanda |
| 2005/0084450 A1 | 4/2005 | Hattori et al. |
| 2005/0091272 A1 | 4/2005 | Smith et al. |
| 2005/0160369 A1 | 7/2005 | Balabanovic et al. |
| 2005/0165880 A1 | 7/2005 | Moody et al. |
| 2005/0190059 A1 | 9/2005 | Wehrenberg |
| 2005/0216526 A1 | 9/2005 | Kumagai |
| 2005/0245281 A1 | 11/2005 | You et al. |
| 2005/0247777 A1 | 11/2005 | Pitroda |
| 2006/0017692 A1 | 1/2006 | Wehrenberg et al. |
| 2006/0026521 A1 | 2/2006 | Hotelling et al. |
| 2006/0033724 A1 | 2/2006 | Chaudhri et al. |
| 2006/0084450 A1 | 4/2006 | Dam et al. |
| 2006/0097991 A1 | 5/2006 | Hotelling et al. |
| 2006/0101350 A1 | 5/2006 | Scott |
| 2006/0151607 A1 | 7/2006 | Horikiri et al. |
| 2006/0171515 A1 | 8/2006 | Hintermeister et al. |
| 2006/0197753 A1 | 9/2006 | Hotelling |
| 2006/0218112 A1 | 9/2006 | Van et al. |
| 2006/0242691 A1 | 10/2006 | Meister |
| 2006/0270419 A1 | 11/2006 | Crowley et al. |
| 2006/0277460 A1 | 12/2006 | Forstall et al. |
| 2007/0009139 A1 | 1/2007 | Landschaft et al. |
| 2007/0016958 A1 | 1/2007 | Bodepudi et al. |
| 2007/0027763 A1 | 2/2007 | Yen et al. |
| 2007/0035513 A1 | 2/2007 | Sherrard et al. |
| 2007/0047697 A1 | 3/2007 | Drewry et al. |
| 2007/0060206 A1 | 3/2007 | Dam et al. |
| 2007/0128899 A1 | 6/2007 | Mayer |
| 2007/0129112 A1 | 6/2007 | Tarn |
| 2007/0156492 A1 | 7/2007 | Hawkins et al. |
| 2007/0162582 A1 * | 7/2007 | Belali .................. G06F 9/542 709/223 |
| 2007/0162942 A1 | 7/2007 | HÄmynen et al. |
| 2007/0271367 A1 | 11/2007 | Yardeni et al. |
| 2007/0271527 A1 | 11/2007 | Paas et al. |
| 2007/0280457 A1 | 12/2007 | Aberethy et al. |
| 2007/0290831 A1 * | 12/2007 | Kalinichenko ......... H04L 67/34 340/506 |
| 2007/0293275 A1 * | 12/2007 | Kalinichenko ..... G06F 16/9566 455/567 |
| 2008/0005679 A1 | 1/2008 | Rimas-Ribikauskas et al. |
| 2008/0040960 A1 | 2/2008 | Keith |
| 2008/0055273 A1 | 3/2008 | Forstall |
| 2008/0059627 A1 | 3/2008 | Hamalainen et al. |
| 2008/0104067 A1 | 5/2008 | Thorson et al. |
| 2008/0125178 A1 | 5/2008 | Park et al. |
| 2008/0132243 A1 | 6/2008 | Spalink et al. |
| 2008/0132251 A1 | 6/2008 | Altman et al. |
| 2008/0133336 A1 | 6/2008 | Altman et al. |
| 2008/0133482 A1 | 6/2008 | Anick et al. |

(56) References Cited

U.S. PATENT DOCUMENTS

| | | |
|---|---|---|
| 2008/0153459 A1 | 6/2008 | Kansal et al. |
| 2008/0161045 A1 | 7/2008 | Vuorenmaa |
| 2008/0162504 A1 | 7/2008 | Rentto et al. |
| 2008/0209516 A1 | 8/2008 | Nassiri |
| 2008/0220752 A1 | 9/2008 | Forstall et al. |
| 2008/0222531 A1 | 9/2008 | Davidson et al. |
| 2008/0270419 A1 | 10/2008 | Watanabe |
| 2008/0282196 A1 | 11/2008 | Park |
| 2008/0301555 A1 | 12/2008 | Vartiainen et al. |
| 2009/0061890 A1 | 3/2009 | Andreasson et al. |
| 2009/0098825 A1* | 4/2009 | Huomo ............... G07F 19/208 705/16 |
| 2009/0164923 A1 | 6/2009 | Ovi |
| 2009/0175509 A1 | 7/2009 | Gonion et al. |
| 2009/0178006 A1 | 7/2009 | Lemay et al. |
| 2009/0309742 A1 | 12/2009 | Alexander et al. |
| 2009/0327976 A1 | 12/2009 | Williamson et al. |
| 2010/0011304 A1 | 1/2010 | Van |
| 2010/0030696 A1 | 2/2010 | Naccache |
| 2010/0060586 A1 | 3/2010 | Pisula et al. |
| 2010/0078472 A1* | 4/2010 | Lin ..................... G06Q 40/02 235/379 |
| 2010/0082444 A1* | 4/2010 | Lin ..................... G06Q 20/042 705/17 |
| 2010/0146384 A1 | 6/2010 | Peev et al. |
| 2010/0159995 A1 | 6/2010 | Stallings et al. |
| 2010/0241663 A1 | 9/2010 | Huang et al. |
| 2010/0257490 A1* | 10/2010 | Lyon ..................... H04M 1/724 715/863 |
| 2010/0306705 A1 | 12/2010 | Nilsson |
| 2011/0047074 A1* | 2/2011 | Cai ..................... G07F 7/0886 705/41 |
| 2011/0053615 A1 | 3/2011 | Lee |
| 2011/0089233 A1 | 4/2011 | Locher |
| 2011/0107197 A1 | 5/2011 | Deluca et al. |
| 2011/0126119 A1* | 5/2011 | Young ..................... G06F 3/048 715/744 |
| 2011/0145049 A1 | 6/2011 | Hertel et al. |
| 2011/0196741 A1 | 8/2011 | Gupta et al. |
| 2011/0202419 A1 | 8/2011 | Mamdani et al. |
| 2011/0231246 A1 | 9/2011 | Bhatia et al. |
| 2011/0246284 A1 | 10/2011 | Chaikin et al. |
| 2011/0252375 A1* | 10/2011 | Chaudhri ............... G06F 3/0486 715/835 |
| 2011/0294467 A1 | 12/2011 | Kim et al. |
| 2012/0009896 A1 | 1/2012 | Bandyopadhyay et al. |
| 2012/0029998 A1 | 2/2012 | Aversano et al. |
| 2012/0046050 A1 | 2/2012 | Hymel et al. |
| 2012/0060123 A1* | 3/2012 | Smith ............... G06F 3/04883 715/833 |
| 2012/0088523 A1 | 4/2012 | Shirakawa et al. |
| 2012/0095878 A1 | 4/2012 | Feldman et al. |
| 2012/0095979 A1 | 4/2012 | Aftab et al. |
| 2012/0097740 A1* | 4/2012 | Lamba ............... G07F 7/0886 235/380 |
| 2012/0117467 A1 | 5/2012 | Maloney et al. |
| 2012/0117499 A1 | 5/2012 | Mori et al. |
| 2012/0158472 A1 | 6/2012 | Singh et al. |
| 2012/0159388 A1 | 6/2012 | Chalouhi et al. |
| 2012/0214442 A1 | 8/2012 | Crawford et al. |
| 2012/0231785 A1 | 9/2012 | Poon et al. |
| 2012/0278080 A1 | 11/2012 | Singh et al. |
| 2012/0284297 A1 | 11/2012 | Aguera-Arcas et al. |
| 2012/0303431 A1* | 11/2012 | Phillips ............... G06Q 30/02 705/14.22 |
| 2012/0323933 A1 | 12/2012 | He et al. |
| 2013/0145303 A1 | 6/2013 | Prakash et al. |
| 2013/0157637 A1 | 6/2013 | Bos |
| 2013/0198506 A1 | 8/2013 | Smith et al. |
| 2013/0200149 A1* | 8/2013 | Dorsey ............... G06Q 20/40 235/380 |
| 2013/0282438 A1* | 10/2013 | Hunter ............... G01S 1/72 705/7.32 |
| 2013/0332826 A1 | 12/2013 | Karunamuni et al. |
| 2014/0047331 A1* | 2/2014 | Feldman ............... G06F 40/205 715/273 |
| 2014/0282084 A1* | 9/2014 | Murarka ............... G06F 3/0482 715/752 |
| 2017/0352197 A1 | 12/2017 | Mitsunaga et al. |
| 2018/0121409 A1 | 5/2018 | Karunamuni et al. |
| 2019/0026009 A1 | 1/2019 | Van Os |

FOREIGN PATENT DOCUMENTS

| | | |
|---|---|---|
| CN | 1708773 A | 12/2005 |
| CN | 1845165 A | 10/2006 |
| CN | 101809581 A | 8/2010 |
| CN | 101826219 A | 9/2010 |
| CN | 201765630 U | 3/2011 |
| EP | 1327929 A1 | 7/2003 |
| JP | 2000-148985 A | 5/2000 |
| JP | 2000-163031 A | 6/2000 |
| JP | 2002-318951 A | 10/2002 |
| JP | 2002-342033 A | 11/2002 |
| JP | 2003-281306 A | 10/2003 |
| JP | 2005-115099 A | 4/2005 |
| JP | 2006-195592 A | 7/2006 |
| JP | 2007-52574 A | 3/2007 |
| JP | 2009-135705 A | 6/2009 |
| JP | 2009-217712 A | 9/2009 |
| JP | 2010-224933 A | 10/2010 |
| JP | 2010-263578 A | 11/2010 |
| JP | 2010-536188 A | 11/2010 |
| JP | 2011-123755 A | 6/2011 |
| JP | 2012-511282 A | 5/2012 |
| KR | 2001-0090485 A | 10/2001 |
| KR | 2008-0085353 A | 9/2008 |
| TW | 201035860 A | 10/2010 |
| TW | 201145200 A | 12/2011 |
| TW | 201203156 A | 1/2012 |
| WO | 2002/088996 A1 | 11/2002 |
| WO | 2013/169849 A2 | 11/2013 |
| WO | 2013/184840 A2 | 12/2013 |
| WO | 2014/105276 A1 | 7/2014 |

OTHER PUBLICATIONS

Extended European Search Report received for European Patent Application No. 13170575.8, dated Sep. 11, 2013, 6 pages.
Final Office Action received for U.S. Appl. No. 13/843,962, dated Apr. 9, 2018, 6 pages.
Final Office Action received for U.S. Appl. No. 13/843,962, dated Dec. 23, 2016, 15 pages.
Final Office Action received for U.S. Appl. No. 13/843,962, dated Nov. 6, 2015, 25 pages.
International Search Report and Written Opinion received for PCT Patent Application No. PCT/US13/44372, dated Dec. 6, 2013, 4 pages.
Lee et al., "A Multi-Touch Three Dimensional Touch-Sensitive Tablet", CHI'85 Proceedings, Apr. 1985, pp. 21-25.
Non Final Office Action received for U.S. Appl. No. 13/843,962, dated Jun. 16, 2016, 16 pages.
Non-Final Office Action received for U.S. Appl. No. 13/843,962, dated Apr. 23, 2015, 23 pages.
Non-Final Office Action received for U.S. Appl. No. 13/843,962, dated Aug. 22, 2017, 19 pages.
Non-Final Office Action received for U.S. Appl. No. 13/843,962, dated Aug. 9, 2018, 21 pages.
Notice of Allowance received for U.S. Appl. No. 13/843,962, dated Feb. 25, 2019, 9 pages.
Notice of Allowance received for U.S Patent Application No. 15/852,577, dated Apr. 10, 2018, 16 pages.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Rubine, Dean, "Combining Gestures and Direct Manipulation", CHI'92, May 3-7, 1992, pp. 659-660.

(56) References Cited

OTHER PUBLICATIONS

Search Report received for Chinese Patent Application No. 201380028092.8, dated Jul. 5, 2016, 3 pages.
Search Report received for Taiwan Patent Application No. 102120383, dated Mar. 9, 2016, 2 pages.
Search Report received for Taiwan Patent Application No. 102120383, dated May 14, 2015, 4 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
European Search Report received for European Patent Application No. 19192442.2, dated Dec. 4, 2019, 9 pages.
Podio, F. L., "Personal Authentication Through Biometric Technologies", Networked Appliances, Proceedings 2002 IEEE 4th International Workshop, ISBN 978-0-7803-7259-7, Jan. 15-16, 2001, pp. 57-66.
Advisory Action received for U.S. Appl. No. 11/969,902, dated Nov. 28, 2012, 3 pages.
Advisory Action received for U.S. Appl. No. 11/969,902, dated Oct. 21, 2015, 3 pages.
Examiner's Answer to Appeal Brief received for U.S. Appl. No. 11/969,902, dated Aug. 11, 2016, 10 pages.
Examiner's Answer to Appeal Brief received for U.S. Appl. No. 12/170,295, dated Jul. 1, 2016, 17 pages.
Final Office Action received for U.S. Appl. No. 11/969,902, dated Aug. 15, 2012, 9 pages.
Final Office Action received for U.S. Appl. No. 11/969,902, dated Feb. 18, 2011, 15 pages.
Final Office Action received for U.S. Appl. No. 11/969,902, dated Mar. 12, 2015, 12 pages.
Final Office Action received for U.S. Appl. No. 12/170,295, dated Dec. 20, 2013, 19 pages.
Final Office Action received for U.S. Appl. No. 12/170,295, dated Jan. 31, 2013, 20 pages.
Final Office Action received for U.S. Appl. No. 12/170,295, dated Mar. 19, 2015, 24 pages.
Final Office Action received for U.S. Appl. No. 12/170,295, dated Nov. 1, 2011, 16 pages.
"iPhone Matters", Available on Internet at: <http://www.iphonematters.com/article/my_iphone_wish_phone_contact_home_screen_icons_392/>, Jan. 9, 2008, 3 pages.
Non-Final Office Action received for U.S. Appl. No. 11/969,902, dated Dec. 19, 2011, 12 pages.
Non-Final Office Action received for U.S. Appl. No. 11/969,902, dated Jul. 22, 2014, 14 pages.
Non-Final Office Action received for U.S. Appl. No. 11/969,902, dated Jun. 10, 2010, 11 pages.
Non-Final Office Action received for U.S. Appl. No. 12/170,295, dated Dec. 27, 2010, 12 pages.
Non-Final Office Action received for U.S. Appl. No. 12/170,295, dated Jun. 20, 2014, 16 pages.
Non-Final Office Action received for U.S. Appl. No. 12/170,295, dated Jun. 21, 2012, 19 pages.
Non-Final Office Action received for U.S. Appl. No. 12/170,295, dated Jun. 21, 2013, 26 pages.
Non-Final Office Action received for U.S. Appl. No. 16/143,306, dated Jun. 1, 2020, 10 pages.
Notice of Allowance received for U.S. Appl. No. 11/969,902, dated Jun. 15, 2018, 5 pages.
Notice of Allowance received for U.S. Appl. No. 12/170,295, dated Jun. 1, 2018, 7 pages.
Patent Board Decision received for U.S. Appl. No. 11/969,902, mailed on Mar. 28, 2018, 6 pages.
Patent Board Decision received for U.S. Appl. No. 12/170,295, mailed on Mar. 28, 2018, 7 pages.
Access Co. Ltd., "Net Front Browser v3.4", 2006, 6 pages.
Final Office Action received for U.S. Appl. No. 16/143,306, dated Feb. 8, 2021, 9 pages.
Non-Final Office Action received for U.S. Appl. No. 16/143,306, dated Jun. 24, 2021, 10 pages.
Search Report received for Chinese Patent Application No. 201810631691.3, dated Jul. 7, 2021, 5 pages (2 pages of English Translation and 3 pages of Official Copy).
Final Office Action received for U.S. Appl. No. 16/143,306, dated Mar. 8, 2022, 12 pages.
Vincent et al., "Real Estate Icon Placement", IP.com No. IPCOM000169417D, Motorola Inc., Apr. 15, 2008, 3 pages.
Search Report received for Chinese Patent Application No. 201910447045.6, dated Sep. 2, 2022, 7 pages (3 pages of English Translation and 4 pages of Official Copy).
Search Report received for Chinese Patent Application No. 201810631691.3, dated Sep. 6, 2022, 8 pages (3 Pages of English Translation and 5 Pages of Official Copy).
Li et al., "Illumination Invariant Face Recognition Using Near-Infrared Images", IEEE Transactions on Pattern Analysis and Machine Intelligence, vol. 29, No. 4, Apr. 2007, pp. 627-639.
Wang, Jian, "Security Control Requirements and Basic Methods of Electronic Commerce", Modern Electronic Technology, Issue 8, Aug. 25, 1999, 3 pages. See attached Communication 37 CFR § 1.98(a)(3).

* cited by examiner

INTELLIGENT PRESENTATION OF DOCUMENTS

CROSS REFERENCE TO RELATED APPLICATIONS

This application is a continuation of U.S. patent application Ser. No. 13/843,962, filed Mar. 15, 2013 and published on Dec. 12, 2013 as U.S. Patent Publication No. 2013-0332826, which claims the benefit under 35 USC 119(e) of U.S. Patent Application No. 61/656,931, filed Jun. 7, 2012, the contents of which are incorporated herein by reference in their entirety for all purposes.

TECHNICAL FIELD

The disclosure generally relates to managing and presenting documents on a display of a computing device.

BACKGROUND

Loyalty cards, identification cards, coupons, tickets, boarding passes and other documents are used by people every day when making purchases, proving identity, gaining access to events and when travelling. With the ubiquitous use of mobile computing devices, many of these documents have been digitized and are stored on mobile computing devices. However, managing and accessing the digitized versions of these documents on the mobile computing device can be cumbersome and time consuming.

SUMMARY

In some implementations, documents can be presented on a display of a computing device based on a context of the computing device. The context can include a current time and/or current location associated with the computing device. The documents can be presented based on a time and/or location associated with the documents. Documents can be downloaded and shared between devices. Documents can be dynamically updated based on document vendor provided information and/or information from other network based resources. In some implementations, the various graphical interfaces described herein provide access to a variety of document types in an organized and efficient manner.

Particular implementations provide at least the following advantages: Documents can be presented in anticipation of a user's need to use the documents. Documents can be presented so that they are easily accessible. Documents can provide dynamically updated information associated with the documents so that the user has easy access to the most up to date information.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

This disclosure describes various Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 1:
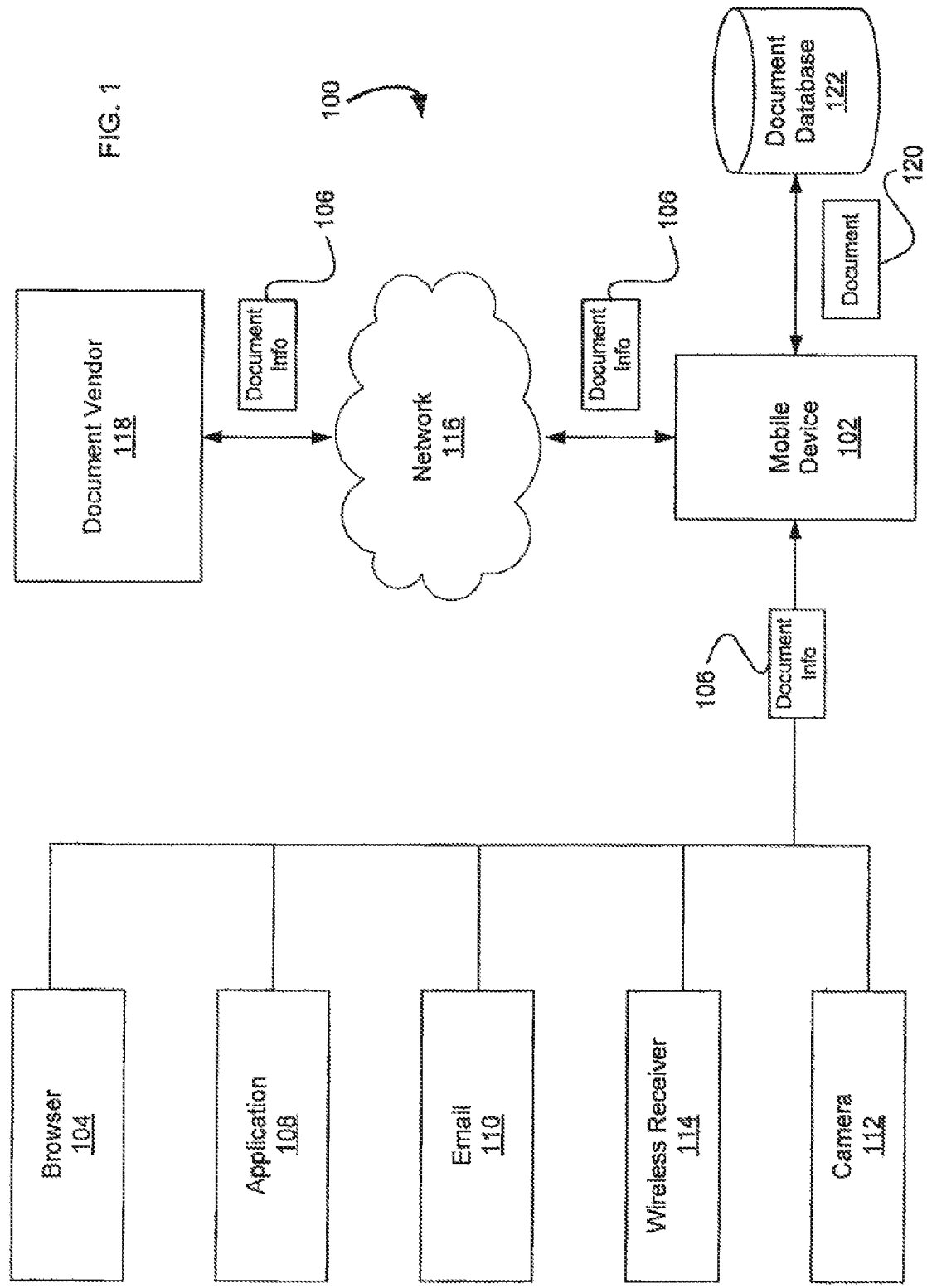
FIG. 1 illustrates an example system for receiving, storing and updating documents on a mobile device.

FIG. 1 illustrates an example system 100 for receiving, storing and updating documents on a mobile device. For example, the documents of system 100 can include customer loyalty cards, event tickets, vouchers, coupons, boarding passes, identification cards, key cards (e.g., cards to access hotel rooms, houses, cars, etc.) or any other type of document. In some implementations, system 100 can include mobile device 102. For example, mobile device 102 can be a laptop computer, a smartphone, a feature phone, a tablet computer or any other type of computing device.

In some implementations, mobile device 102 can include applications that a user of mobile device 102 can use to obtain various documents. For example, mobile device 102 can include browser 104. Browser 104 can be used to access webpages where the user can purchase tickets to an event, boarding passes for travel or other types of documents. Browser 104 can be used to access webpages where the user can subscribe to customer loyalty programs of various vendors or commercial enterprises. The document information 106 generated by these transactions can be downloaded or transmitted to mobile device 102 through browser 104. For example, information associated with the purchased ticket, boarding pass or other documents can be transmitted to mobile device 102 through browser 104. Information associated with a customer loyalty card or account generated by the user's subscription to a customer loyalty program can be transmitted to mobile device 102 through browser 104.

In some implementations, mobile device 102 can include application 108. For example, application 108 can be client application to a network (e.g., Internet) service that allows a user to download documents. Application 108 can be a client application that allows the user to purchase event tickets and download the event tickets to mobile device 102. Application 108 can be a travel application that allows the user to purchase airplane boarding passes and hotel accommodations. When a user purchases items through application 108, document information 106 associated with those purchases can be download to mobile device 108 through application 108.

In some implementations, mobile device 102 can include email application 110. For example, instead of receiving document 106 through browser 104 or application 108, mobile device 102 can receive document information 106 as an email attachment. For example, browser 104 and/or application 108 may not be configured to allow document downloads. Thus, if a user purchases a document using browser 104 or application 108, the online vendor can send to the user an email having document information 106 attached.

In some implementations, mobile device 102 can include wireless receiver 114. For example, wireless receiver 114 can be configured to receive Wi-Fi signals, Bluetooth signals, near field communication signals or any other type of wireless or radio signals. In some implementations, wireless receiver 114 can receive document information 106 encoded in a wireless transmission. For example, computing devices can share document information 106 by encoding document information 106 into wireless signals and transmitting the wireless signals to other devices. Mobile device 102 can, for example, receive document information 106 from another computing device.

In some implementations, mobile device 102 can include image capture device 112. For example, image capture device 112 can be a digital camera that is built into mobile device 102. In some implementations, a user can use image capture device 112 to capture document information 106 encoded on a physical document. For example, a paper, plastic or other physical document can have a bar code, quick response code, linear bar codes, matrix codes, or any other type of code that can be optically scanned. The user can capture an image of the paper document using image capture device 112 and mobile device 102 can determine document information 106 based on the captured image. For example, an image of the document can be captured and optical character recognition software can be used to determine document information 106.

In some implementations, document information 106 can include all of the information for generating a document on mobile device 102. For example, document information 106 can include the user's name, vendor information, user's account identifier and other information for generating a document on mobile device 102. In some implementations, document information 106 can include a document template identifier and data associated with the document template, as described further below.

In some implementations, only a minimum amount of information is included in document information 106. For example, the minimum information can include a transaction identifier and a vendor URL (uniform resource locator). Mobile device 102 can use the vendor URL to access a document vendor server 118 through network 116. Mobile device 102 can transmit document information 106 to document vendor server 118. Document vendor server 118 can use the transaction identification information contained in document information 106 to identify information associated with a document and provide the complete document information to mobile device 102. Once mobile device 102 receives the document information from vendor server 118, mobile device can generate document 102 and store document 102 in document database 122. For example, based on the document information received from vendor server 118, mobile device 102 can identify a document template and populate the document template with the document information provided by document vendor server 118, as described further below.

In some implementations, document 102 can be stored on a network device. For example, document database 122 can be a network or cloud-based database. Mobile device 102 can store document 102 on a network device and access document 102 as needed from the network device.

New Document Interface

Figure 2:
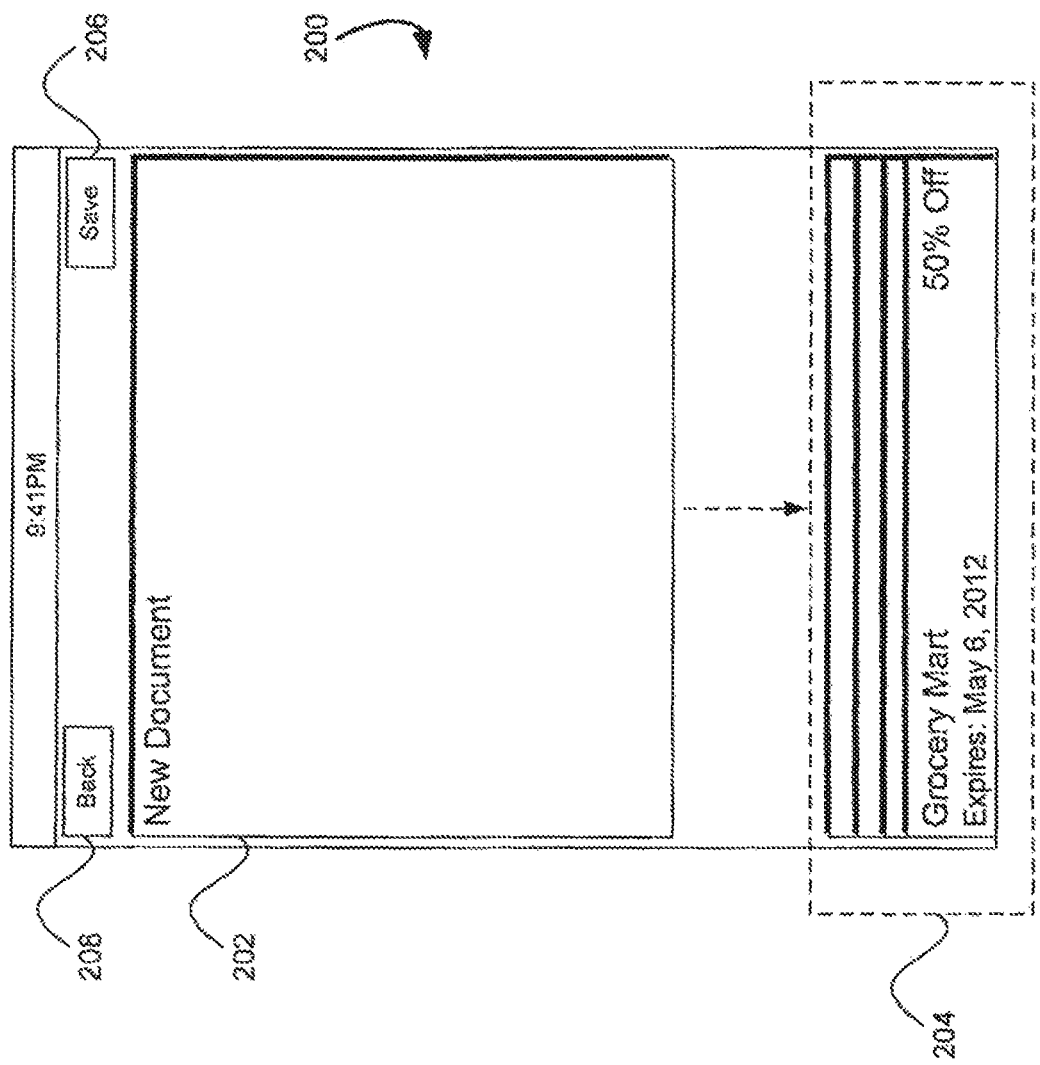
FIG. 2 illustrates an example of a new document interface.

FIG. 2 illustrates an example of a new document interface 200. For example, new document interface 200 can be presented when document information is received by mobile device 102, as described above. For example, if document information is received from a website through a browser application, the graphical interface of the browser application can be replaced on the display of the mobile device with new document interface 200. Similarly, if document information is received through another application, the displayed application can be replaced on the display of the mobile device with new document interface 200.

In some implementations, new document interface 200 can present newly generated document 202. New document 202 can correspond to the document information received at the mobile device and can be generated based on a document template, described below. New document 202 can include vendor-provided data specific to the newly generated document. For example, if new document 202 corresponds to a boarding pass, new document 202 can display flight information associated with the boarding pass. If new document 202 is the only document currently stored on the mobile device, then new document 202 can be the only document displayed on new document interface 202. If new document 202 is not the only document currently stored on the mobile device, then the other documents currently stored on the mobile device can be presented in an overlapping presentation 204.

In some implementations, an animation can be presented when adding a new document to documents stored on the mobile device. For example, to save new document 202 on the mobile device a user can select graphical element 206. In response to the selection of graphical element 206, document 202 can be animated to appear to be inserted into the overlapping presentation 204. For example, document 202 can slide downward across the display of the mobile device until the new document is inserted into the stack of other documents on the mobile device. In some implementations, the user can return to the previous application by selecting graphical element 208. In response to the selection of graphical element 208, new document interface 200 can be replaced on the display of the mobile device by the application that received the new document. For example, if the user was viewing an email application before new document interface 200 was displayed, the email application can replace new document interface 200 on the display when graphical element 208 is selected.

Intelligent Presentation of Documents

Figure 3:
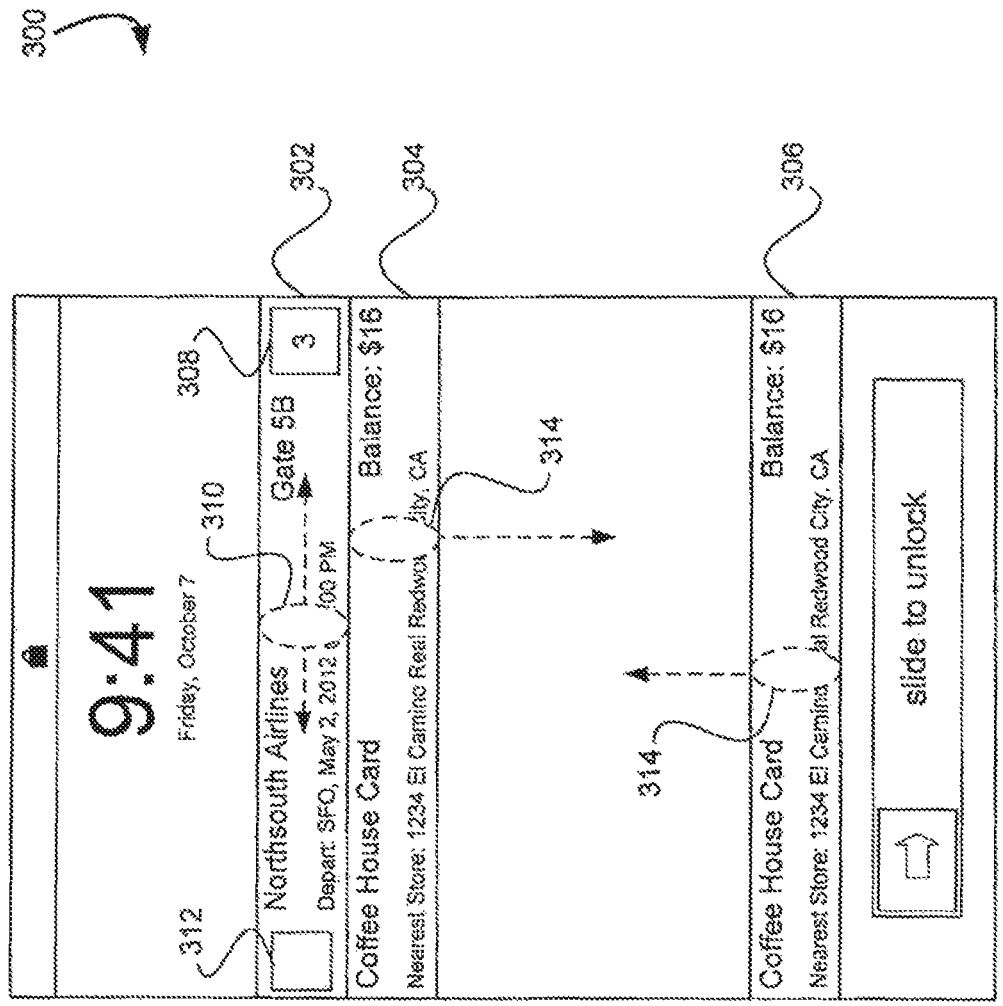
FIG. 3 illustrates an example graphical interface for presenting documents based on time and/or location.

FIG. 3 illustrates an example graphical interface 300 for presenting documents based on time and/or location. In some implementations, documents stored on the mobile device can be associated with a time (e.g., a predetermined date and/or time). Boarding passes for transportation can be associated with a departure and/or boarding time. Event tickets (e.g., concert ticket, movie tickets, etc.) can be associated with an event start time. Sale coupons can be associated with an expiration date. In some implementations, when the current time is close to the predetermined time associated with the document, the document can be presented on graphical interface 300 in anticipation of the user's imminent use of the document. In some implementations, a document can be associated with a time period or window for presentation of the document. For example, if the document is a discount coupon with an expiration date, the discount coupon can be associated with a window of one week in which the discount coupon can be presented on graphical interface 300. The one week window can be a one week period of time prior to and including the expiration date of the discount coupon.

In some implementations, documents stored on the mobile device can be associated with a location. For example, discount coupons and customer loyalty cards can be associated with a location of a store. Boarding passes can be associated with a location of a transportation hub (e.g., airport, bus terminal, train station, etc.). In some implementations, when the mobile device detects that the current location of the mobile device is proximate to a location associated with a document, the document can be displayed. For example, if the mobile device's current location is proximate to a location of a store associated with a loyalty card stored on the mobile device, the loyalty card document can be displayed on graphical interface 300.

In some implementations, graphical interface 300 can be a lock display of a mobile device. For example, graphical interface 300 can be an interface that is displayed when the mobile device is in a locked state where a password or code is required to access functions of the mobile device. Graphical interface 300 can be the first interface seen by the user when the user wakes the mobile device from a sleep or low power state.

In some implementations, graphical interface 300 can present document notification 302. For example, document notification 302 can correspond to an airline boarding pass document stored on the mobile device. Document notification 302 can be presented on graphical interface 300 when the mobile device detects that the mobile device is proximate to a location (e.g., the airport) associated with the boarding pass document and/or a time (e.g., boarding or departure time) associated with the boarding pass document. Document notification 302 can present information associated with the boarding pass document. For example, document notification 302 can present an abstract or portion (e.g., select items) of information associated with the boarding pass document. Document notification 302 can present the name of the airline, a gate number and departure time, for example. Document notification 302 can indicate how many boarding passes are stored on the mobile device. For example, if a family is travelling together, the boarding passes for each member of the family can be stored on the mobile device. The number of boarding passes for a particular trip can be indicated by graphical element 308, for example.

In some implementations, a user can select document notification 302 to cause the associated boarding pass document to be displayed. For example, a user can perform a swipe gesture 310 to cause the boarding pass document to be displayed. In some implementations, the user can drag graphical element 312 (e.g., document icon) across document notification 302 to cause the boarding pass document to be displayed.

In some implementations, multiple document notifications can be displayed. For example, document notification 302 and document notification 304 can be displayed on graphical interface 300. For example, document notification 304 can correspond to a customer loyalty card for a coffee house. Document notification 304 can be displayed when the current location of the mobile device is proximate to an address of the coffee house, for example. Document notification 304 can present an abstract of information associated with the coffee house customer loyalty card. For example, if the coffee house card can be used to purchase coffee at the coffee house and the card is associated with an account balance (e.g., $16), then the account balance can be displayed on document notification 304. Document notification 304 can display the nearest location of the coffee house store, for example.

In some implementations, a user can select document notification 304 to cause the associated coffee house document to be displayed on the mobile device. For example, a user can provide touch input 314 and swipe down starting at a location of document notification on the mobile device. As the user swipes (e.g., pulls) down on the notification, the associated document can be revealed and/or displayed on the mobile device.

In some implementations, document notifications can be presented near the bottom of graphical interface 300. For example, document notification 306 can be presented near the bottom of graphical interface 300. A user can provide touch input 316 (e.g., an upward swipe) to cause the associated document to be displayed.

In some implementations, document notifications can be presented in response to receiving a document information update. For example, when the mobile device receives an update to flight information associated with a boarding pass document, a document notification corresponding to the boarding pass document can be presented on graphical interface 300. The document notification can present the changed flight information so that the user can be quickly informed of the change. For example, the changed information can be highlighted using colored text or graphical objects (e.g., icons, animations, etc.) that draw the user's attention to the changed information, as described further below.

In some implementations, after a selection of document notification 302, 304, or 306 is received, the user's identity can be verified and the user can be confirmed to be an authorized user of the mobile device and/or document associated with the selected document notification. For example, the user can be prompted for an unlock code or password for the mobile device. The document associated with the selected notification can be presented after the user enters the correct code or password.

In some implementations, the mobile device can be configured to biometrically verify the identity of the user. In some implementations, the mobile device can be configured to verify the user's identity based on the user's fingerprint. For example, the mobile device scan the user's fingerprint and compare the scanned fingerprint to a previously authenticated fingerprint of an authorized user of the mobile device and/or selected document. The previously authenticated fingerprint (or biometric data derived from the previously authenticated fingerprint) can be stored on the mobile device or stored on a remote server. The stored fingerprint can be retrieved from the local or remote storage location when the mobile device performs the fingerprint comparison during the user verification process.

In some implementations, the mobile device can be configured to verify the user's identity using facial recognition techniques. For example, the mobile device can be configured with a camera that can capture an image of the user's face when the user selects a document. The captured image can be compared to a previously authenticated image of the user (or biometric data derived from a previously captured image of the user) to verify the identity of the user who selected the document. The captured image (or biometric data) can be stored on the mobile device or a remote server and accessed when the mobile device compares the captured image to the previously authenticated image and/or biometric data.

In some implementations, biometric authentication can be performed using sensors (e.g., camera, finger scanner, etc.) configured on the mobile device. In some implementations, biometric authentication can be performed using a touch-sensitive display screen of the mobile device. For example, when the user touches the touch-screen interface of the mobile device, the mobile device can capture the fingerprint of the user.

In some implementations, user authentication/verification using the techniques described above (e.g., password, fingerprint, facial recognition, etc.) can be performed in response to a user selecting a document notification or in response to a user selecting a document (e.g., selecting a document to view). In some implementations, user authentication/verification can be performed when the user attempts to initiate a transaction using a document stored on the mobile device. For example, if the user attempts to use a document to make a purchase, the mobile device can scan the user's fingerprint (or face) and verify that the user is an authorized user of the document before allowing the purchase or presenting (e.g., displaying, transmitting, etc.) information to facilitate the purchase. In some implementations, biometric authentication/verification can be performed passively. For example, as the user makes a document selection using touch input on a touch screen display, the mobile device can capture the fingerprint of the user. Likewise, the mobile device can capture an image of the user's face as the user makes a selection of a document. Thus, passive biometric authentication can be performed such that the user does not have to provide authentication-specific input. For example, authentication-specific input can be a user providing a fingerprint as touch input to the mobile device in response to an authentication/verification prompt presented by the mobile device (e.g., where the sole purpose of the touch input is authentication of the user).

Figure 4:
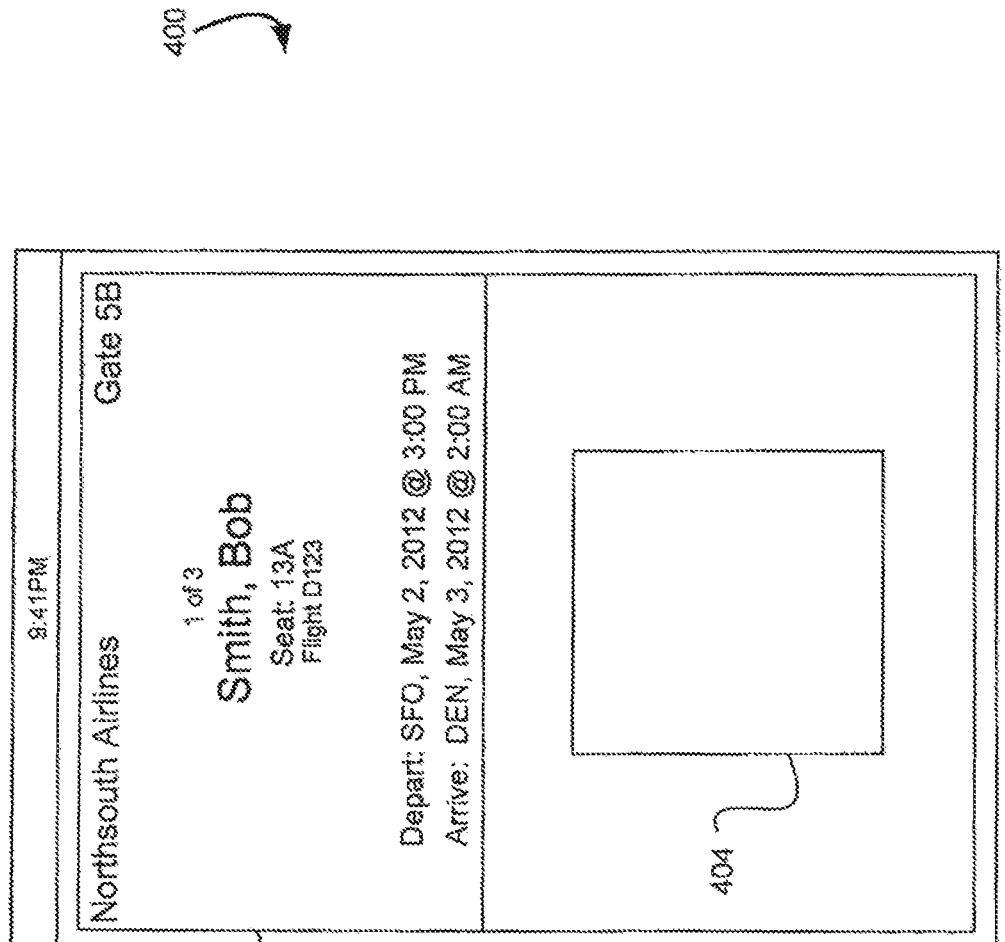
FIG. 4 illustrates an example graphical interface for presenting document 402 on the mobile device.

FIG. 4 illustrates an example graphical interface 400 for presenting document 402 on the mobile device. For example, graphical interface 400 can be presented in response to a user selecting document notification 302 of FIG. 3. Document 402 can be an airline boarding pass document, for example. If document notification 304 or 306 is selected, graphical interface 400 can present a coffee house customer loyalty card document, for example.

In some implementations, document 402 can present vendor-provided information associated with document 402. For example, document 402 can present airline provided information associated with a boarding pass, including airline name, departure gate, name of passenger, seat number, flight number, departure time, departure location, arrival time, arrival location and any other relevant travel information. In some implementations, if multiple boarding passes associated with the same flight are stored on the mobile device, document 402 can include an indication of the number of boarding passes (e.g., 1 of 3) stored on the mobile device. If multiple boarding pass documents exist on the mobile device, the user can provide input (e.g., touch input, swipe gesture) to navigate between the boarding pass documents.

In some implementations, document 402 can include an optically scannable and/or machine-readable graphical element 404. For example, graphical element 404 can be a two-dimensional bar code or code matrix that can be scanned by a bar code reader, camera and/or other optical scanning device. When the user uses document 402 to board an airplane, for example, an airport employee can scan graphical element 404 to process the boarding pass and retrieve information associated with a passenger. In some implementations, near field communications technologies, Bluetooth, and/or other wireless transmission mechanisms can be used to transmit document information and facilitate transactions between a user and a vendor.

Document Management Application

Figure 5:
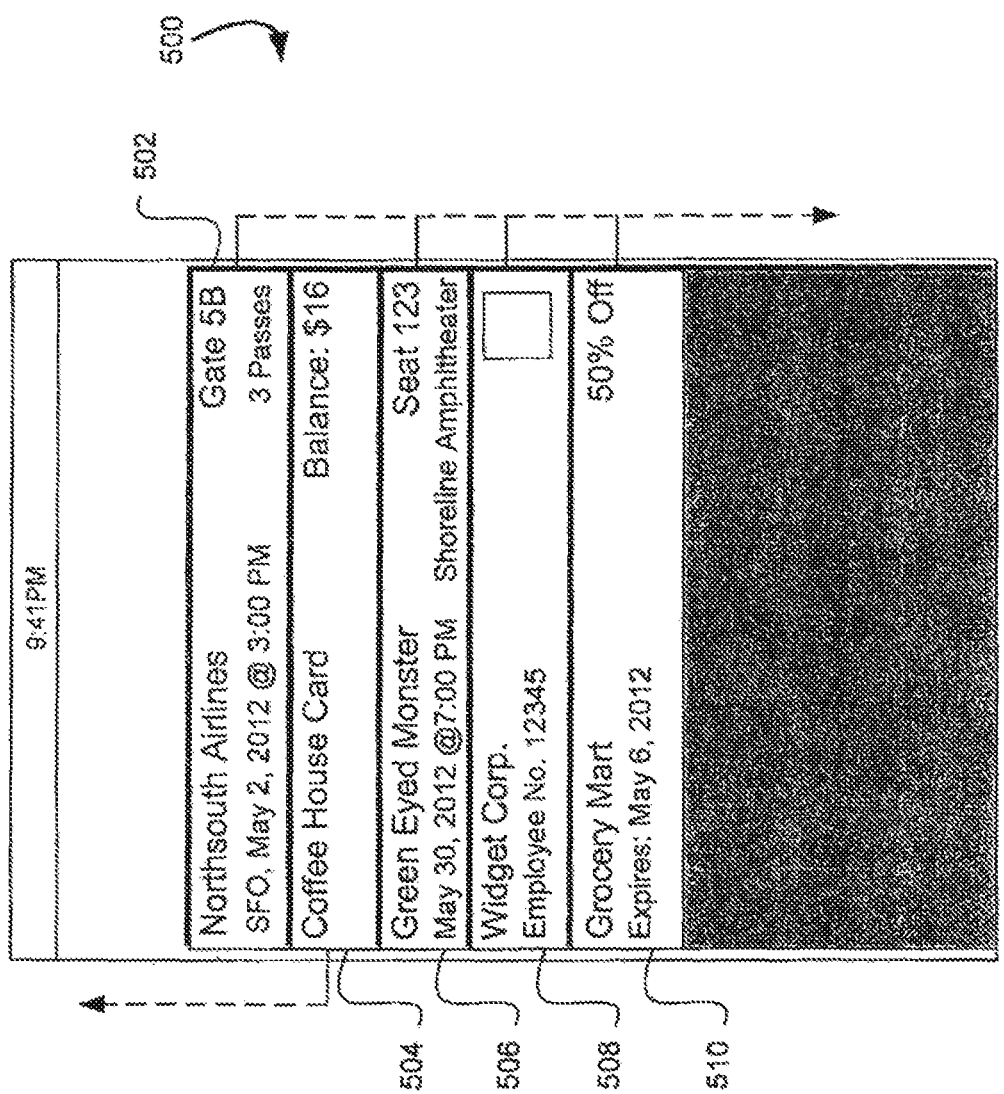
FIG. 5 illustrates an example graphical interface of a document management application.

FIG. 5 illustrates an example graphical interface 500 of a document management application. For example, the mobile device can include a document management application. The user can invoke the document management application by selecting a graphical element (e.g., an icon) presented on a user interface of the mobile device. Graphical interface 500 can be presented on the display of the mobile device in response to an invocation of the document management application. In some implementations, if the mobile device is currently storing only one document, then graphical interface 500 will present the document in a manner similar to graphical interface 400. If the mobile device is storing two documents, the documents can be tiled in graphical interface 500 such that both documents can be fully viewed.

In some implementations, when three or more documents are stored on the mobile device, the documents can be displayed in an overlapping presentation, as illustrated by FIG. 5. For example, when the documents are displayed in an overlapping presentation, a portion (e.g., top portion) of each document can be displayed and the portion can present an abstract of the information associated with the document. For example, the abstract information can include a selection of the most important or useful information associated with each document. This information can include the name of the document vendor (e.g., a business associated with the document), and other information that the user might wish to know by glancing at the displayed portion of the document. For example, account balances, gate numbers, seat numbers, event locations and times, discount offers and discount amounts can be presented in the displayed portion of the document so that the user can quickly determine important information about the document without having to select the document.

In some implementations, a user can select the displayed portion of the document to cause a full view of the document to be displayed. For example, graphical interface 500 can display document abstracts 502-510. The document abstracts can include the most important (e.g., most useful) document information. For example, the document abstracts can present information that distinguishes one document from another document. Document abstract 502 can correspond to an airline boarding pass document. Document abstract 504 can correspond to a customer loyalty card (e.g., purchase card) document. Document abstract 506 can correspond to an event ticket (e.g., concert ticket) document. Document abstract 508 can correspond to an identification card document. Document abstract 510 can correspond to a customer loyalty card document. A user can select document abstract (e.g., document portion) 504 to present a full view of the corresponding customer loyalty card document.

In some implementations, when a user selects a document abstract an animation can be presented in conjunction with the presentation of the corresponding document. For example, when the user selects document abstract 504, an animation can be presented that causes document abstract 504 to move upward and the other document abstracts 502, 506, 508 and 510 to move downward. The movement of the document abstracts is indicated by the dashed arrows on FIG. 5. As document abstract 504 moves upward a full view of the corresponding document can be revealed, as illustrated by FIG. 6.

Other mechanisms/animations can be implemented to present a full view of a document in response to a selection of a document abstract. In some implementations, when the user selects a document abstract the corresponding document can fade into view while the non-selected documents fade out of view on the display of the mobile device. In some implementations, the non-selected documents can slide left or right off of the display to reveal the selected document. In some implementations, the selected document abstract can be shuffled to the front (e.g., the position nearest the user) of the presentation of document abstracts. When the selected document abstract reaches the front of the of the document abstracts, the full version of the document can be displayed.

Figure 6:
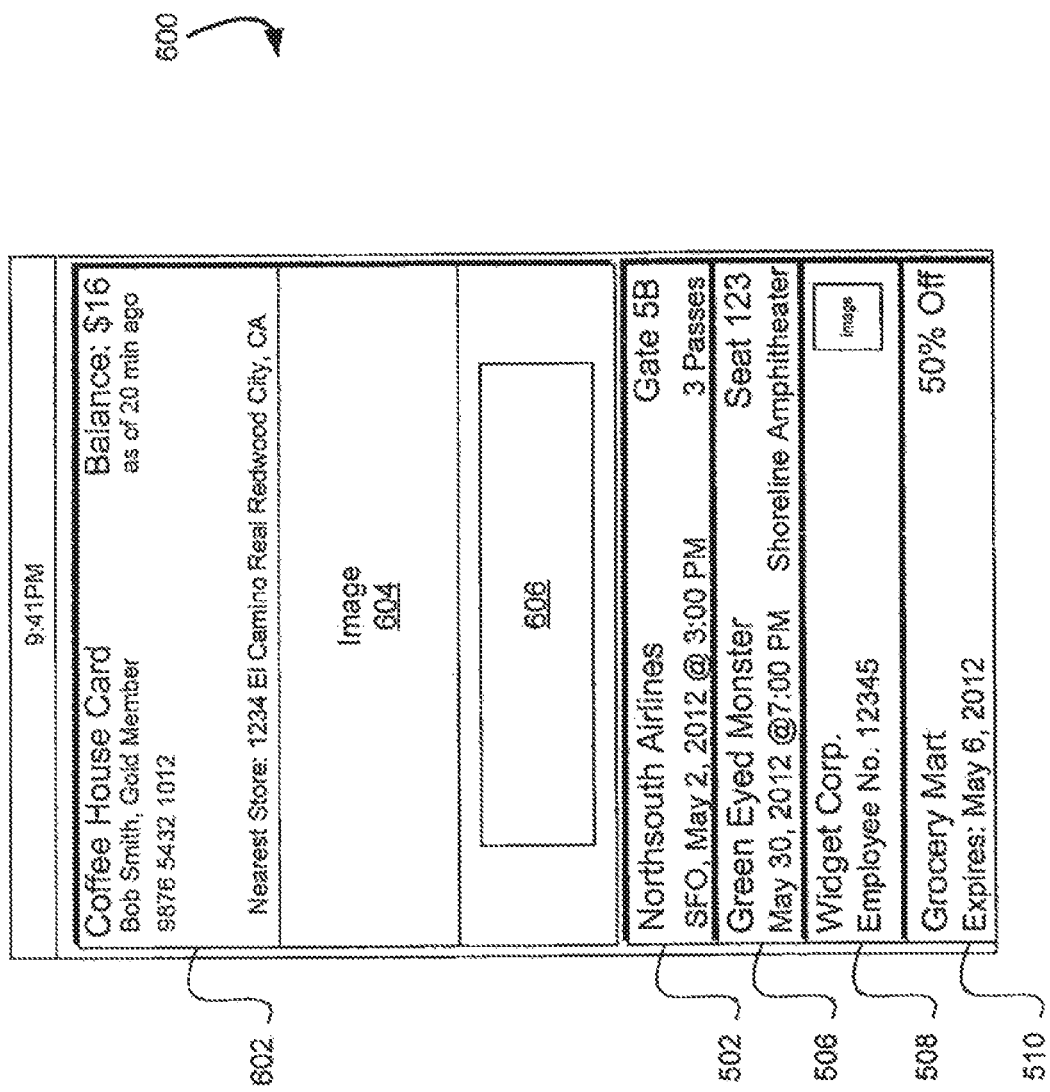
FIG. 6 illustrates an example graphical interface of a document management application.

FIG. 6 illustrates an example graphical interface 600 of a document management application. For example, graphical interface 600 can be presented in response to a user selecting document abstract 504 of FIG. 5. Graphical interface 600 illustrates the result of the animation triggered by the selection of document abstract 504. For example, the document abstracts 502, 504, 506 and 508 that were not selected by the user can be moved to the bottom of the display and presented in an overlapping manner. The selected document abstract 504 can be moved to the top of the display. As the animation is presented a full view of the document 602 corresponding to the selected document abstract 504 can be presented. The effect of the animation is to present a simulation of a physical card, file, or folder being pulled out of a stack of cards, a filing cabinet, wallet or other physical storage mechanism.

In some implementations, document 602 can present a full view of the information associated with the document. For example, compared document abstract 504 that merely displays select items of information, document 602 can present all of the information associated with the document. Document 602 can display a name of the document vendor, an account balance, the name of the document user/owner, account number, nearest store location, and other information relevant to the user's use of the document. In some implementations, document 602 can present an image 604. Image 604 can include an image associated with the document vendor (e.g., a logo, trademark, etc.). Image 604 can be configured to present additional information, as described in further detail below.

In some implementations, document 602 can present scannable element 606. For example, element 606 can be a linear bar code, a matrix bar code, a quick response code, scannable text or other optical machine-readable representation of data. Scannable element 606 can be encoded with data associated with document 602. For example, the encoded data can include a vendor identifier, vendor URL, user account number, a transaction number, or any other information associated with document 602. Scannable element 606 can be presented to a vendor and scanned by an optical scanning device or image capture device. The scannable element can be decoded to extract the encoded document information. The encoded document information can be used to obtain a complete set of information associated with the scanned document. For example, the vendor URL and account number can be used to contact a vendor server and access account information associated with the scanned document 602, as described above with reference to FIG. 1. The scannable element 606 can facilitate quick and easy transactions between the user of the mobile device and the document vendor, for example.

Presenting Related Documents

Figure 7:
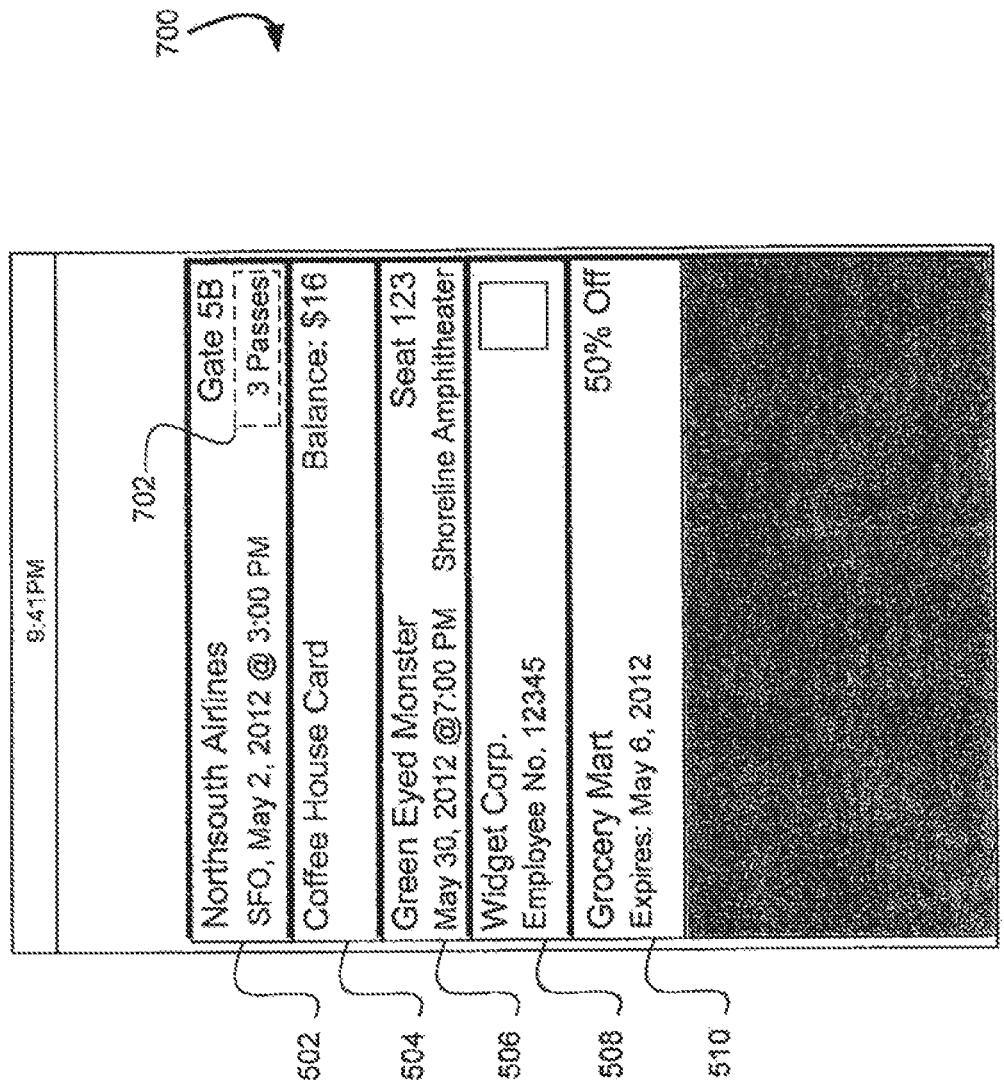
FIG. 7 illustrates an example graphical interface for presenting multiple related documents.

FIG. 7 illustrates an example graphical interface 700 for presenting multiple related documents. For example, multiple boarding pass documents can be related based on flight number, departure location and departure time. Event tickets can be related by event and time. Documents can be related based on how the documents were received. For example, documents that are received as a result of the same transaction, received in the same communication (e.g., email) or received at the same time (or close to the same time) can be identified as related documents. When a user has multiple related tickets stored on the mobile device, these tickets can be represented on graphical interface 700 by a single document abstract 502 and an indicator 702 that informs the user that multiple documents exist that are related to the document abstract. For example, document abstract 502 can include text indicating that three boarding passes are available on the mobile device.

Figure 8:
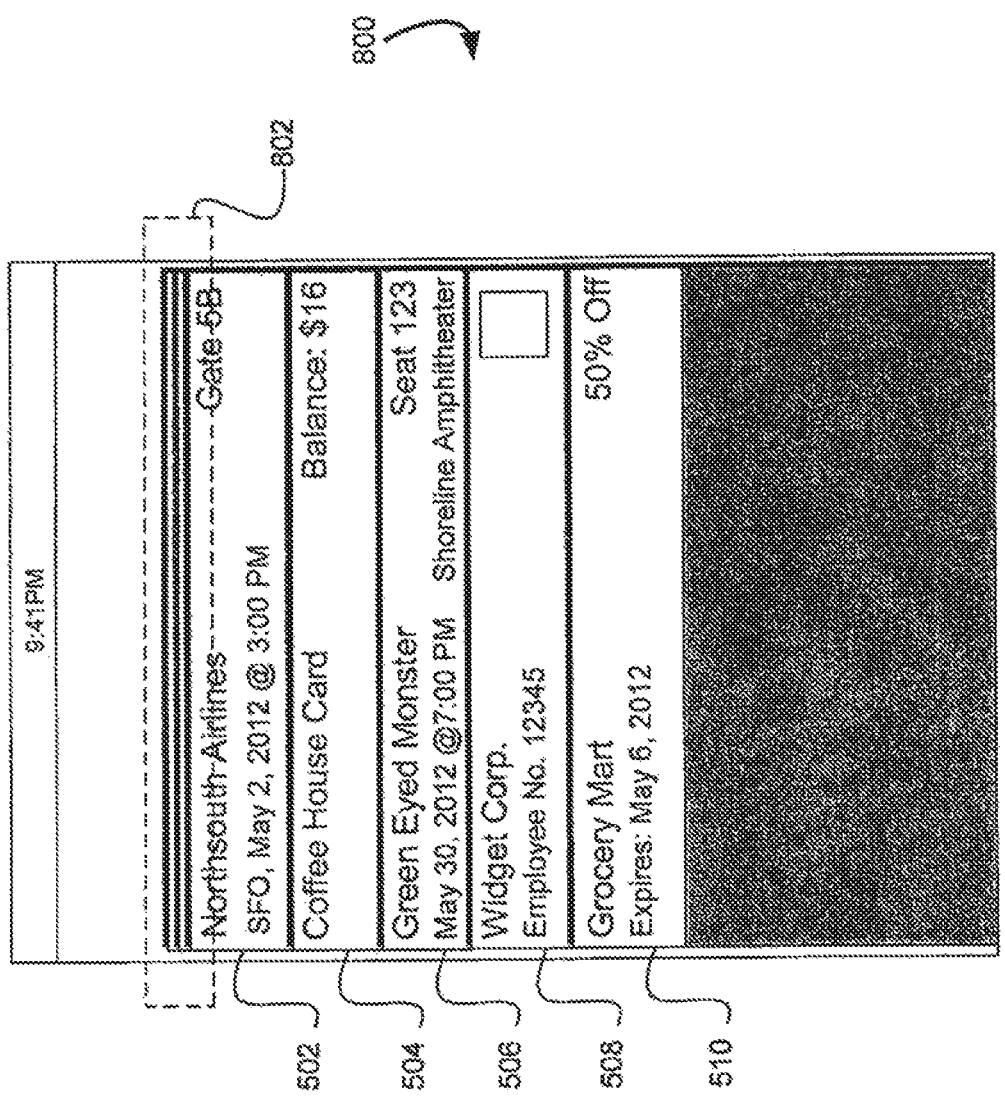
FIG. 8 illustrates an example graphical interface for presenting multiple related documents.

FIG. 8 illustrates an example graphical interface 800 for presenting multiple related documents. For example, instead of presenting indicator 703 on document abstract 502, interface 800 can indicate multiple related documents by displaying a stacked presentation 802 for the multiple related documents. The number of items in the stacked presentation can correspond to the number of documents related to document abstract 502. Stacked presentation 802 can have the appearance of multiple stacked documents where the tops of each document are visible, for example.

Figure 9:
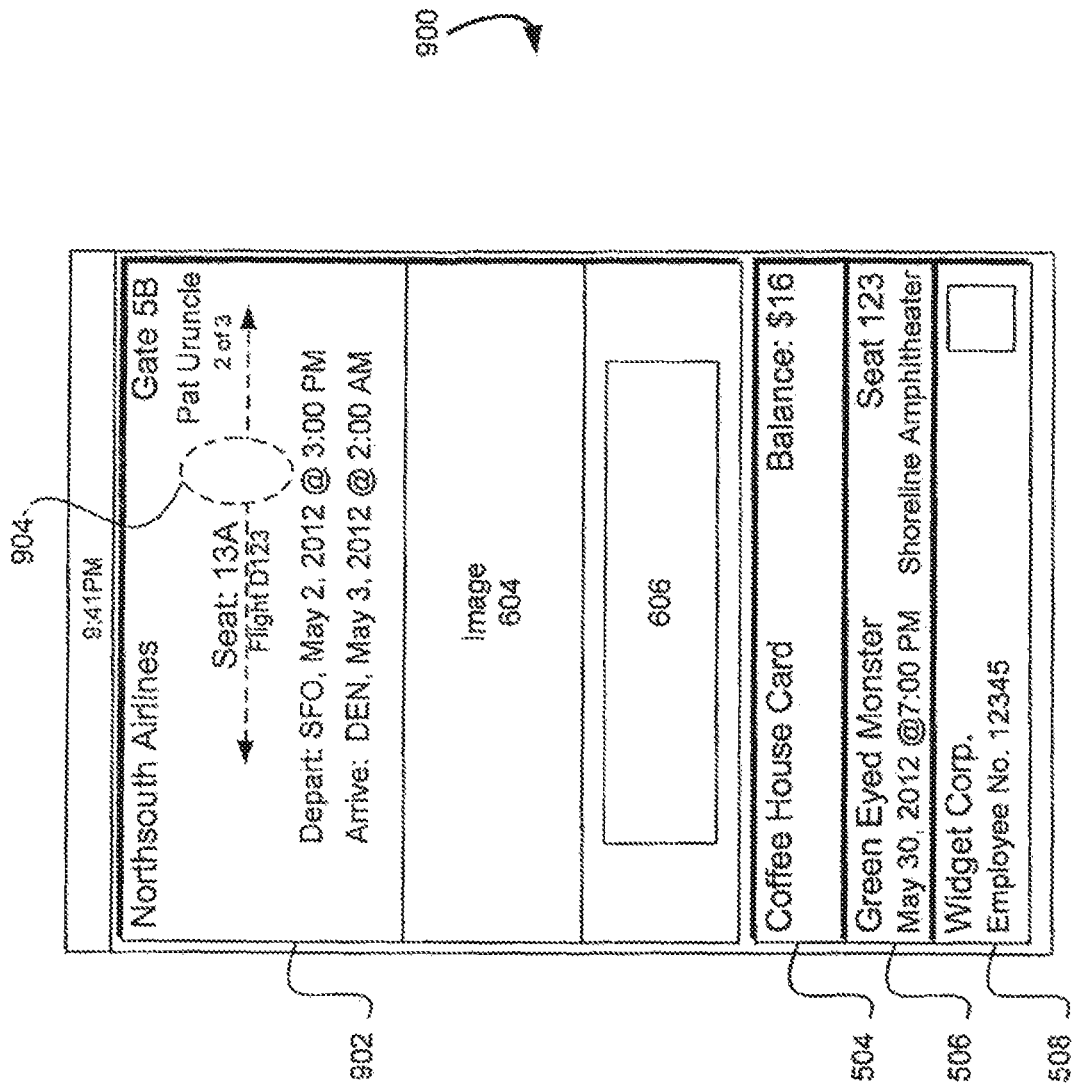
FIG. 9 illustrates an example graphical interface for presenting multiple related documents.

FIG. 9 illustrates an example graphical interface 900 for presenting multiple related documents. For example, document 902 can be one of three related boarding passes. The boarding passes can be related based on flight number, departure time, and/or departure location, for example. In some implementations, only one of the three related documents is presented at a time. For example, when a user selects abstract 502 of FIG. 7 or FIG. 8, one of the documents (e.g., document 902) corresponding to document abstract 502 can be displayed. In some implementations, a user can provide input to document 902 to view the next or previous related document. For example, if there are three related documents, selection of document abstract 502 can cause the first (e.g., 1 of 3) document to be displayed. A user can provide input (e.g., touch input, a tap, or a swipe) to document 902 to cause the second (e.g., 2 of 3) related document to be displayed. A user can provide additional input to cause the third (e.g., 3 of 3) related document to be displayed. For example, the user can provide touch input 904 in the form of a left swipe (e.g., to show previous document) or a right swipe (e.g., to show next document) to navigate between the related documents.

Figure 10:
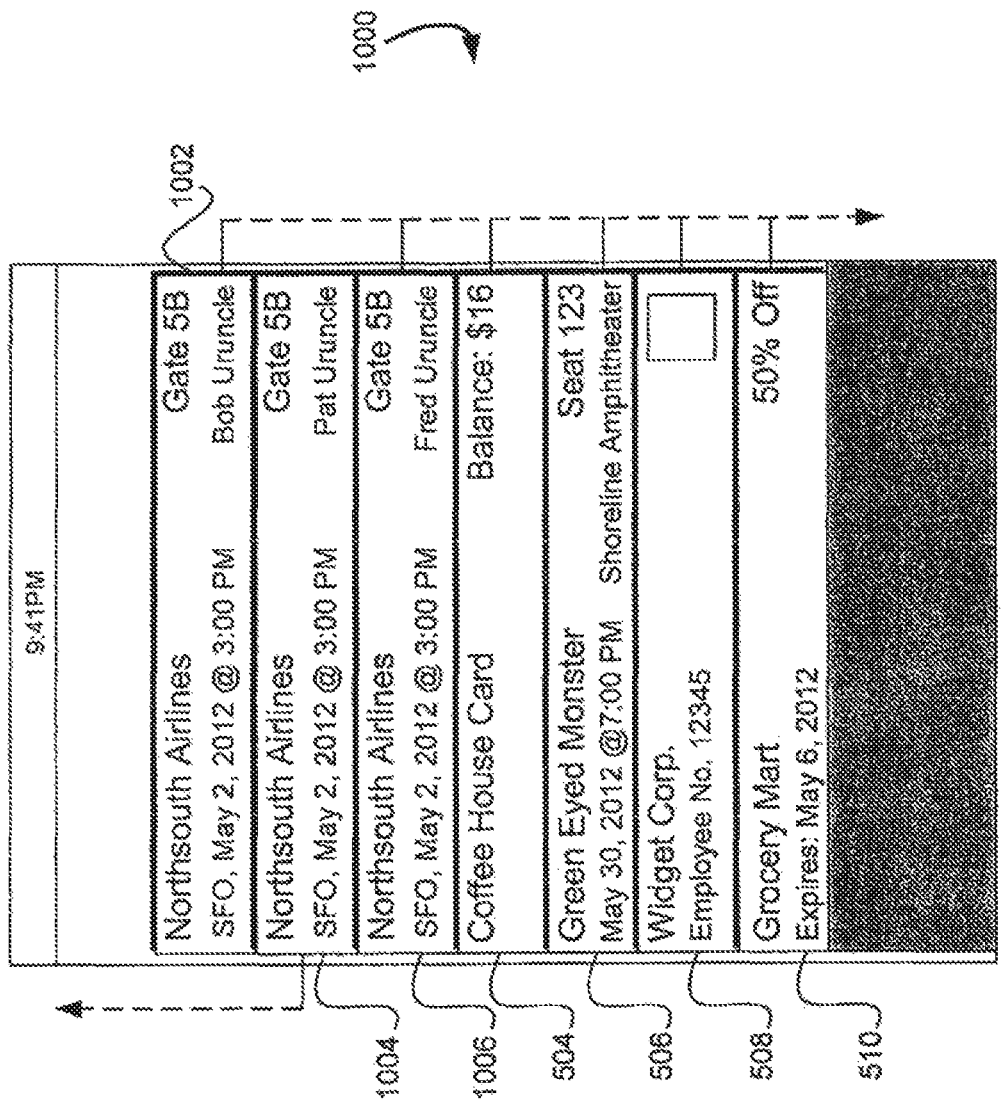
FIG. 10 illustrates an example graphical interface for presenting multiple related documents.

FIG. 10 illustrates an example graphical interface 1000 for presenting multiple related documents. In some implementations, document abstracts for related documents can be grouped on graphical interface 1000. For example, document abstracts 1002, 1004 and 1006 can correspond to boarding pass documents for the same flight. Instead of providing a single document abstract and providing a multiple document indicator as in FIG. 7 or displaying an overlapping presentation as in FIG. 8, related document abstracts 1002, 1004 and 1006 can be displayed independently and grouped together on graphical interface 1000. In some implementations, when multiple related documents abstracts are displayed, the mobile device can automatically determine a distinguishing characteristic (e.g., the most important difference) for each of the related documents to be displayed on the document abstract. For example, each boarding pass is associated with a different passenger. Thus, the passenger name for each boarding pass can be presented on the corresponding document abstract to aid the user in distinguishing between the related document abstracts 1002, 1004 and 1006. To view a corresponding document, a user can select document abstract 1002, 1004 or 1006 to display the corresponding document. In this case, selection of document abstract 1002, 1004 or 1006 will cause the corresponding boarding pass document to be displayed.

In some implementations, when a user selects one of the grouped document abstracts 1002, 1004 or 1006, an animation can be presented to reveal the selected document. For example, the animation can be similar to the animation described with reference to FIG. 5. If the user selects document abstract 1004, document abstract 1004 can move toward the top of the display. The unselected document abstracts 1002, 1006, 504, 506, 508 and 510 can move toward the bottom of the display. The dashed arrows of FIG. 10 indicate the movement of the document abstracts. As the animation (e.g., movement of the document abstracts) is occurring, a full view of the document corresponding to document abstract 1004 can be revealed, as illustrated by FIG. 11

Figure 11:
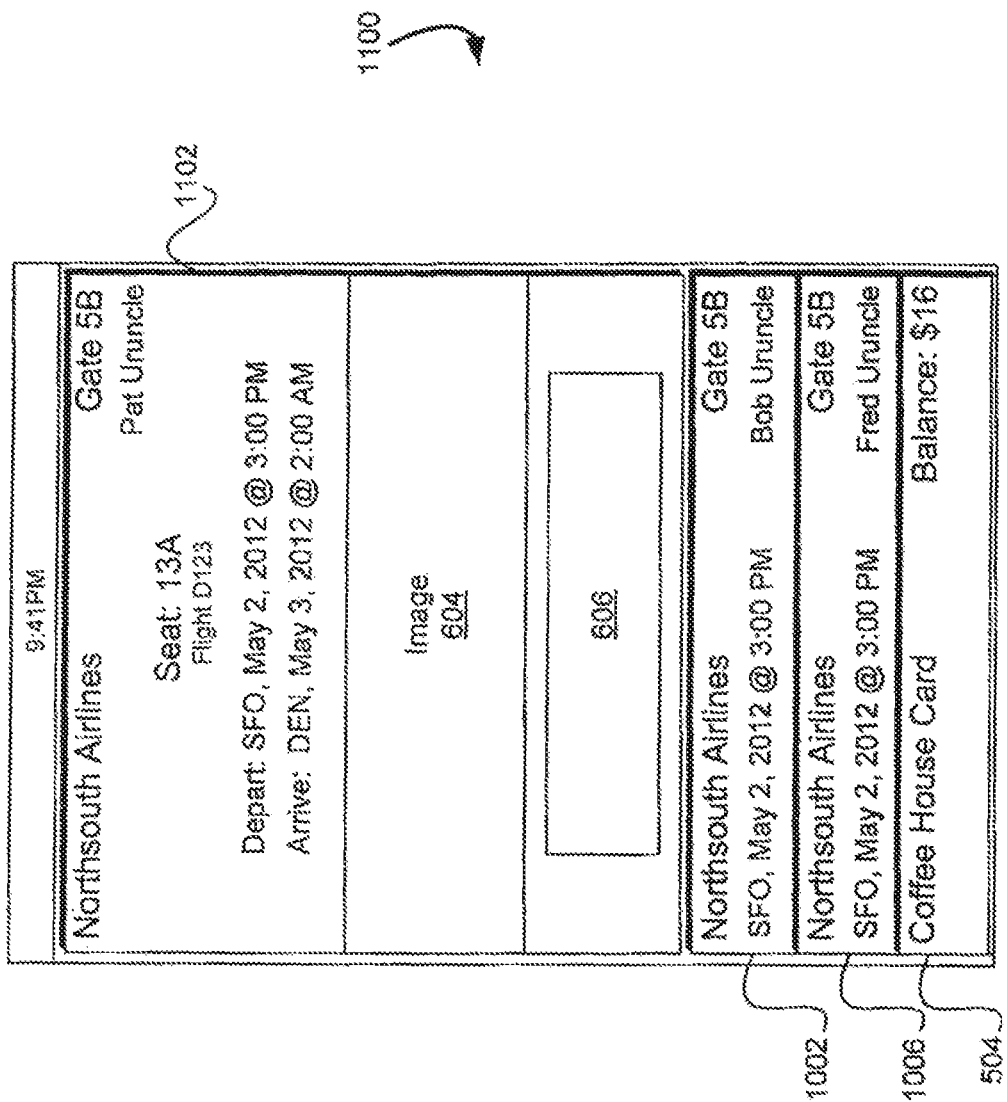
FIG. 11 illustrates an example graphical interface for presenting a selected document.

FIG. 11 illustrates an example graphical interface 1100 for presenting a selected document. For example, graphical interface 1100 can be presented in response to the selection of document abstract 1004. Document 1102 can correspond to selected document abstract 1004 of FIG. 10. The unselected document abstracts 1002, 1006 and 504 can be displayed in an overlapping presentation at the bottom of graphical interface 1100. If the user wishes to view the other documents that are related to document 1102 (e.g., documents corresponding to document abstracts 1002 and 1006), the user can provide input selecting document abstract 1002 or 1006 on graphical interface 1100. In response to the selection of document abstract 1002 or 1006, the corresponding document can be displayed on graphical interface 1100 in a similar manner as document 1102.

In some implementations, selection of document abstract 1002, 1006 or 504 can cause an animation to be presented on graphical interface 1100. For example, if document abstract 1006 is selected, document 1102 can be animated to move downward and into the overlapping presentation of document abstracts 1002, 1006 and 504 until only an document abstract (e.g., document abstract 1004) of document 1102 is visible. Document abstract 1006 can move upward to reveal the document corresponding to document abstract 1006 until a full view of the corresponding document is displayed similar to document 1102. Thus, the animation can appear as if the two documents switch or swap places on graphical interface 1100.

Document Templates

In some implementations, documents can be presented on the display of the mobile device according to predefined document templates. For example, a document template can specify the appearance of the document and the location and type of information displayed on the document. Document templates can specify the look and feel of documents for portrait and/or landscape orientations. For example, a document can have a different layout in portrait orientation than landscape orientation. Different types of documents can be associated with different document templates having different appearances that allow a user to quickly identify a type of document presented on the display of the mobile device based on its appearance. When document information is received from a document vendor, the information can include information that identifies a document template to be used to generate a document on the mobile device. The document template can be identified by a template identifier or by document type data included in the vendor-provided document information. The document templates can determine the look and feel of the documents presented on the graphical interfaces discussed above in FIGS. 1-11.

In some implementations, the vendor-provided document information can include data to be presented on the document, color schemes, images and other information for generating a document on the mobile device. For example, each document template can include data fields that can be populated by vendor provided data. In some implementations, the vendor can dynamically update the data for a document. For example, when account information (e.g., account balance), flight information (e.g., flight number, departure time, boarding time, etc.) or event data (e.g., time, date or venue) changes the corresponding document stored on the mobile device can be updated to reflect the changed information.

In some implementations, documents and/or document templates can be configured to present information that is provided by other network (e.g., Internet) resources. For example, a boarding pass document template can include data fields for departure location and destination location. The boarding pass document template can be configured to display weather, traffic or other information associated with the departure location and destination location, as described below. In some implementations, a user can select location information (e.g., select the text describing the location) displayed on a document and/or document template to invoke a map display corresponding to the selected location.

In some implementations, similar documents can be automatically modified to present distinguishing characteristics to enable the user to distinguish between the documents. For example, if the user has two or more customer loyalty cards from the same vendor, the customer loyalty card documents can be automatically provisioned with different colors, images, or other features that the user can use to distinguish the customer loyalty cards. In some implementations, documents can be automatically updated to present seasonal or holiday themes. For example, documents can be automatically updated to present images of fireworks, U.S. flags or other images during the time around the Fourth of July.

In some implementations, documents and/or document templates can be configured to present optical scannable objects to facilitation transactions between a user and a vendor. For example, a document can include a linear bar code, a two-dimensional matrix bar code, a quick response code, scannable text or other scannable graphic. The optical scannable object can be encoded with document information that can be decoded by an optical scanner. The decoded information can then be used to facilitate transactions between the user and the vendor. For example, the decoded information can include ticket information, account information, user identification information, flight information or any other information needed for performing a particular transaction.

In some implementations, documents and/or document templates can be configured to cause document information to be wirelessly transmitted between the user device and a vendor system. For example, near field communications technologies, Bluetooth and/or other wireless transmission technologies can be used to transmit document information from a user device to a vendor system to facilitate transactions between the user and vendor.

Figure 12:
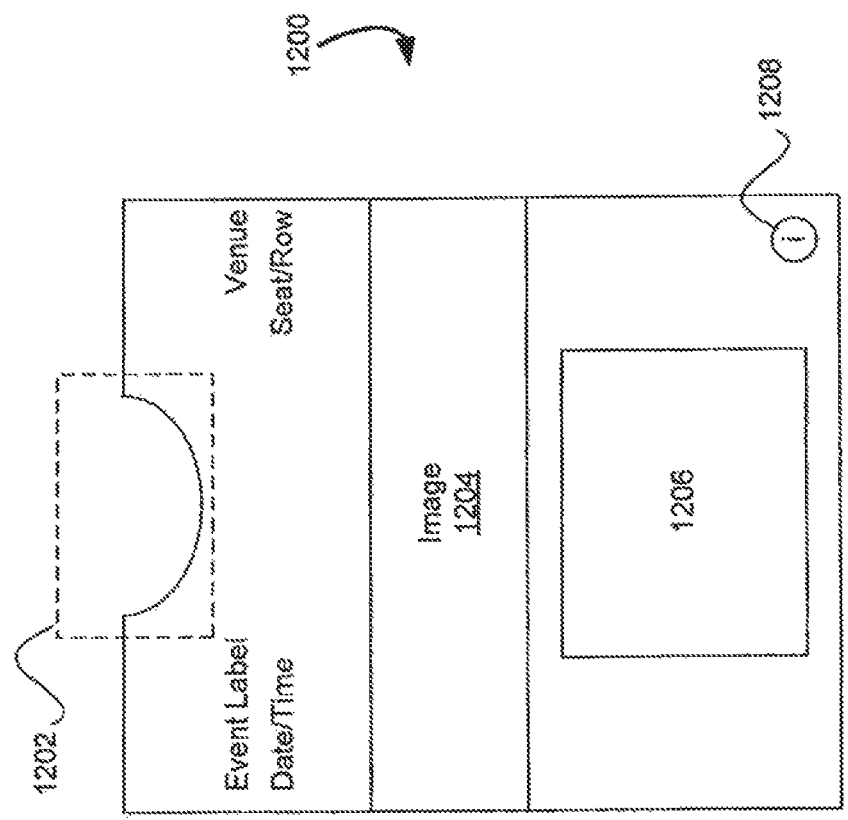
FIG. 12 illustrates an example event ticket template.

FIG. 12 illustrates an example event ticket template 1200. In some implementations, event ticket template can specify the appearance of an event ticket document. For example, an event ticket document can correspond to a movie ticket, concert ticket or a ticket for gaining entry to any other type of event. The appearance of the event ticket template can include a cutout 1202 at the top of the document, for example. The data fields displayed on the event ticket template can include the name of the event, name of the promoter or vendor, the venue, location, date and time of the event. If seating is assigned, the event ticket can specify seat information. Event ticket template 1200 can include an area for presenting image 1204. For example, image 1204 can display an image associated with the event or an image associated with the vendor or promoter. Event ticket 1200 can include scannable object 1206. For example, scannable object 1206 can be an optical machine-readable graphic encoded with document information, as described above. Event ticket template 1200 can include graphical element 1208 for presenting configuration options. For example, a user can select graphical element 1208 to present graphical interface 1800 of FIG. 18.

Figure 13:
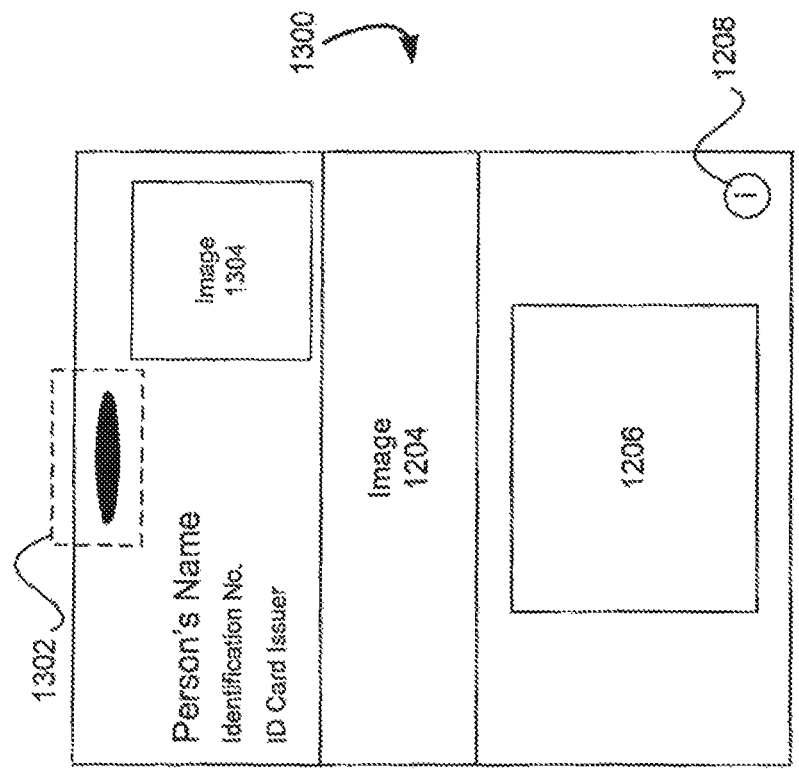
FIG. 13 illustrates an example identification card template.

FIG. 13 illustrates an example identification card template 1300. In some implementations, identification card template 1300 can be visually distinguishable from other documents by the inclusion of graphical element 1302. For example, graphical element 1302 can have the appearance of a hole near the top of the identification card document so that the identification card document resembles a physical identification card (e.g., employee identification card) that a person might wear around their neck or attached to their clothing. Identification card template 1300 can include data fields for presenting a person's name, identification number and identification card issuer (e.g., employer, government entity, etc.). Identification card template 1300 can include image 1304 associated with the person associated with the identification card document. For example, image 1304 can be a picture of the person's face.

Figure 14:
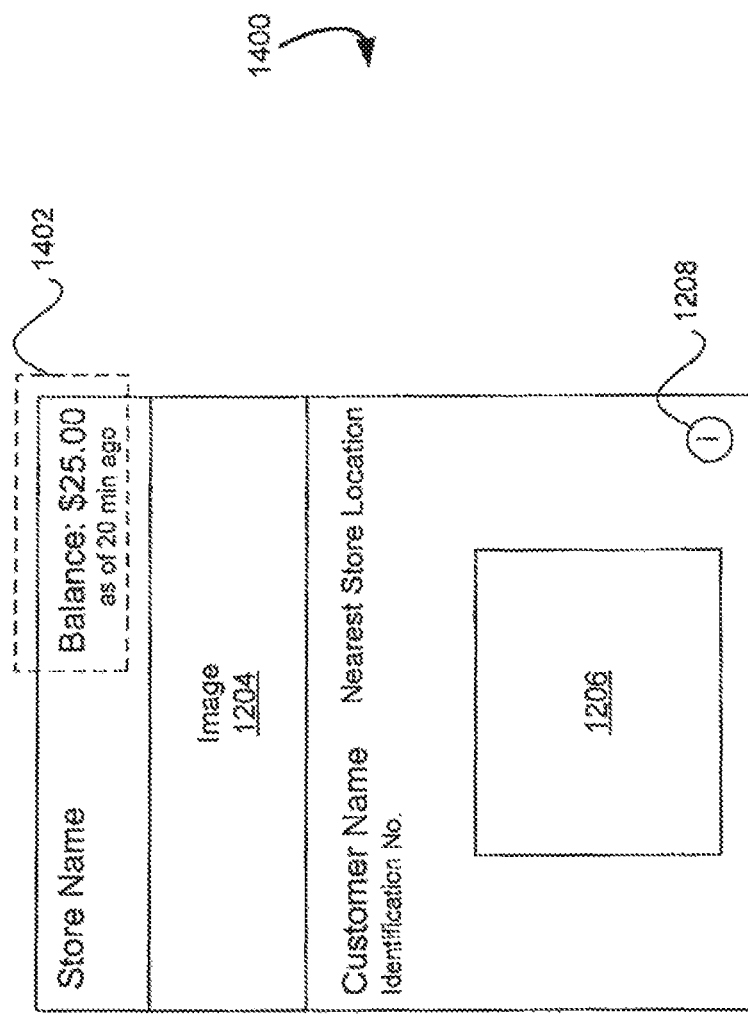
FIG. 14 illustrates an example customer loyalty card template.

FIG. 14 illustrates an example customer loyalty card template 1400. For example, customer loyalty card template can include a vendor/store name, a customer name, customer identification number and/or the nearest store location. In some implementations, the customer loyalty card can function as a store credit card or store purchase card. For example, a customer can transfer money to an account associated with the store purchase card and use the money to purchase items at a store associated with the card. In some implementations, customer loyalty card template 1400 can include an account balance data field 1402. For example, account balance field 1402 can display an account balance (e.g., funds available) for a store credit card or store purchase card. In some implementations, the account balance displayed on a customer loyalty card can be updated dynamically. For example, as the user spends money, adds funds to the account or makes payments to the account associated with the customer loyalty card, the balance displayed in the account balance field can be updated.

For example, a vendor's server can notify the user's mobile device that a change associated with the user's account has occurred, the mobile device can request a data update in response to the change notification, and the data presented on the customer loyalty card can be updated to reflect the changed information. In some implementations, updated or recently changed information can be highlighted by presenting the information using a text color (e.g., red) that is different than the text colors (e.g., black) used for other data displayed on the customer loyalty card document. In some implementations, updated or recently changed information can be highlighted by presenting a graphical element (not shown) indicating that the information has changed. For example, changed information or data can be highlighted by encircling the changed information with a line or presenting an icon or other graphical element that draws the user's attention to the changed information.

Figure 15:
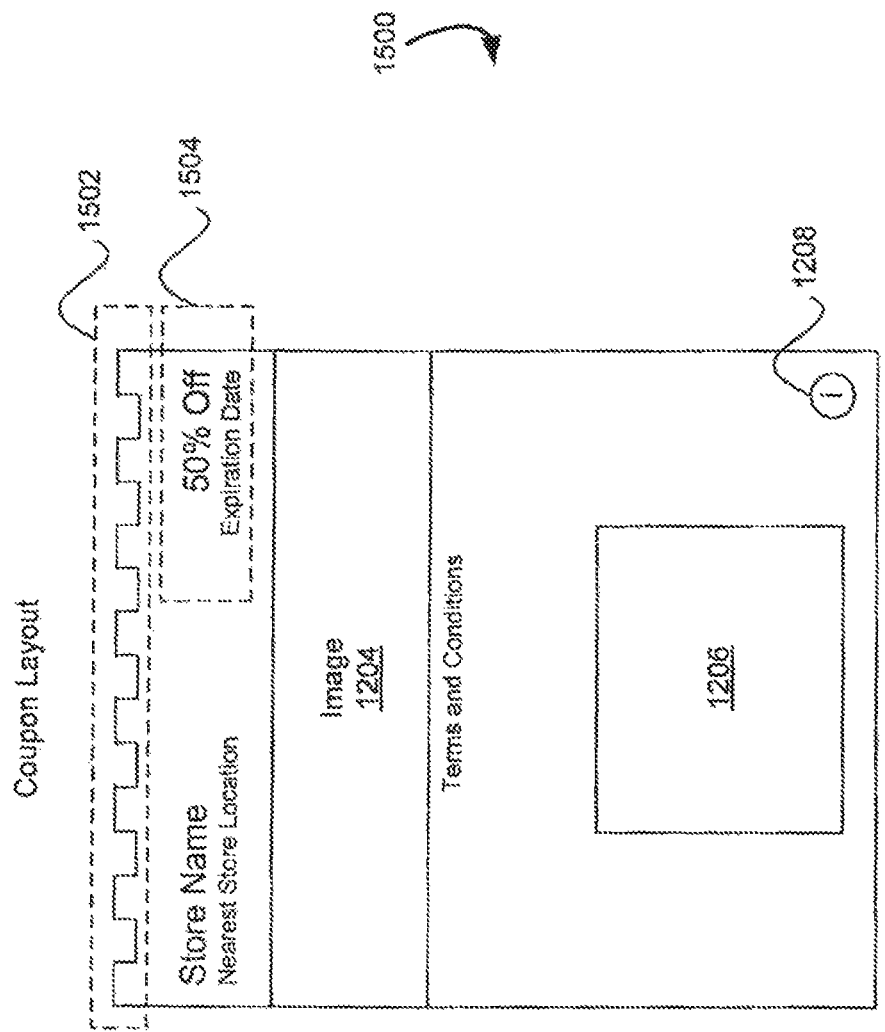
FIG. 15 illustrates an example discount coupon template.

FIG. 15 illustrates an example discount coupon template 1500. In some implementations, discount coupon template 1500 can specify the appearance of a discount coupon document. For example, a discount coupon document can correspond to a coupon for obtaining a discount on the purchase of items from a vendor or store. The appearance of the event ticket template can include an uneven, jagged or perforated edge 1502 at the top of the document, for example, to distinguish the discount coupon document from other documents. Discount coupon template 1500 can include data fields for presenting a vendor/store name, a location of the nearest store and/or terms and conditions associated with the discount coupon.

Discount coupon template 1500 can include a data field 1504 for presenting discount information. For example, the discount information can indicate a specific monetary discount (e.g., $5.00 off) or a percentage discount (25% off) that the user can get with the purchase of an item through the vendor or store. In some implementations, the discount information can be dynamically updated by the vendor. For example, the discount coupon can initially provide a discount of 10%. After a week the discount coupon can provide a discount of 20%. As the discount offered by the vendor increases (or decreases) the vendor can notify the user's mobile device of the change in information associated with the discount coupon document and the mobile device can update the document information to present the updated or changed discount. As described above, the changed information can be highlighted to draw the user's attention to the changed information.

Figure 16:
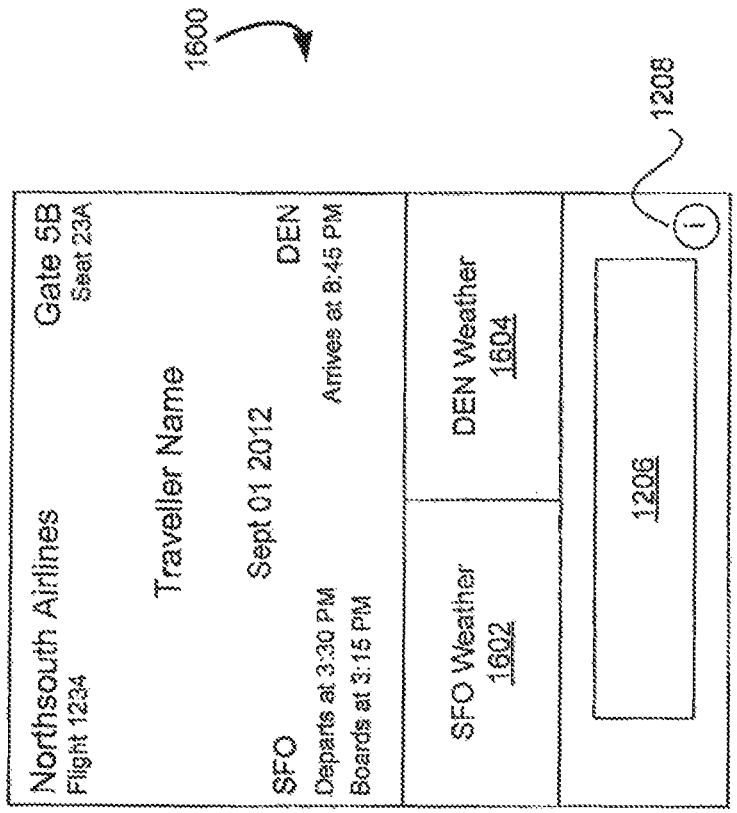
FIG. 16 illustrates an example boarding pass template.

FIG. 16 illustrates an example boarding pass template 1600. For example, the boarding pass template 1600 can provide data fields for presenting boarding pass document information. The boarding pass document information can include the name of the airline, flight number, gate number, seat number, departure location, departure time, boarding time, destination location and/or arrival time, for example. Boarding pass template 1600 can specify the locations where the document information will be presented when the boarding pass document is displayed. In some implementations, the boarding pass document information can be dynamically updated. For example, if there is a change in flight (e.g., the scheduled flight gets delayed or canceled) the information displayed on the boarding pass can be automatically updated to reflect the changed information. For example, a change in flight number, departure time, boarding time, gate number seat number, arrival time, etc., can cause an update to the data presented in the respective fields of boarding pass template 1600.

Boarding pass template 1600 can include dynamic information areas 1602 and 1604. For example, information area 1602 can present information (e.g., traffic, weather, etc.) associated with the flight departure location. Information area 1604 can present information (e.g., traffic, weather, etc.) associated with the destination location. The information in the dynamic information areas 1602 and 1604 can be obtained from various network (e.g., Internet) resources (e.g., websites for weather, traffic, etc.). The dynamic information areas 1602 and 1604 can be updated dynamically as the information changes, for example.

Figure 17:
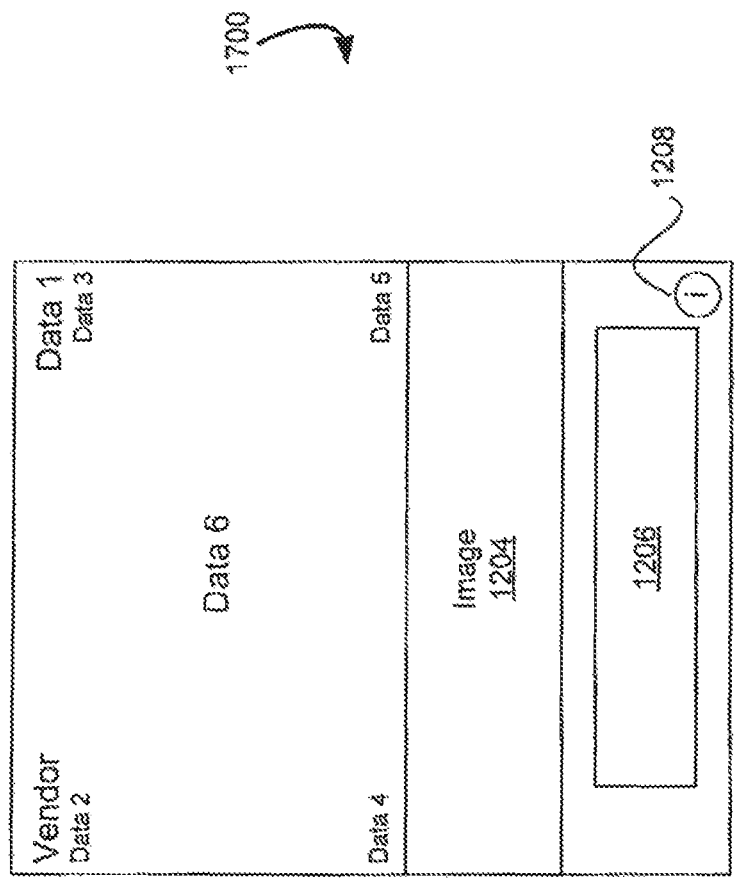
FIG. 17 illustrates an example generic document template.

FIG. 17 illustrates an example generic document template 1700. For example, generic document template 1700 can be used for determining the presentation of documents that do not fit into one of the document categories described above with respect to FIGS. 12-18. A vendor can provide document information that can be inserted into the various data fields provided by generic document template 1700. In some implementations, vendors can specify their own document formats. For example, document formats can be specified using a hypertext markup language (HTML). Thus, a document vendor can provide a vendor-specific document layout with a customized look and feel.

Figure 18:
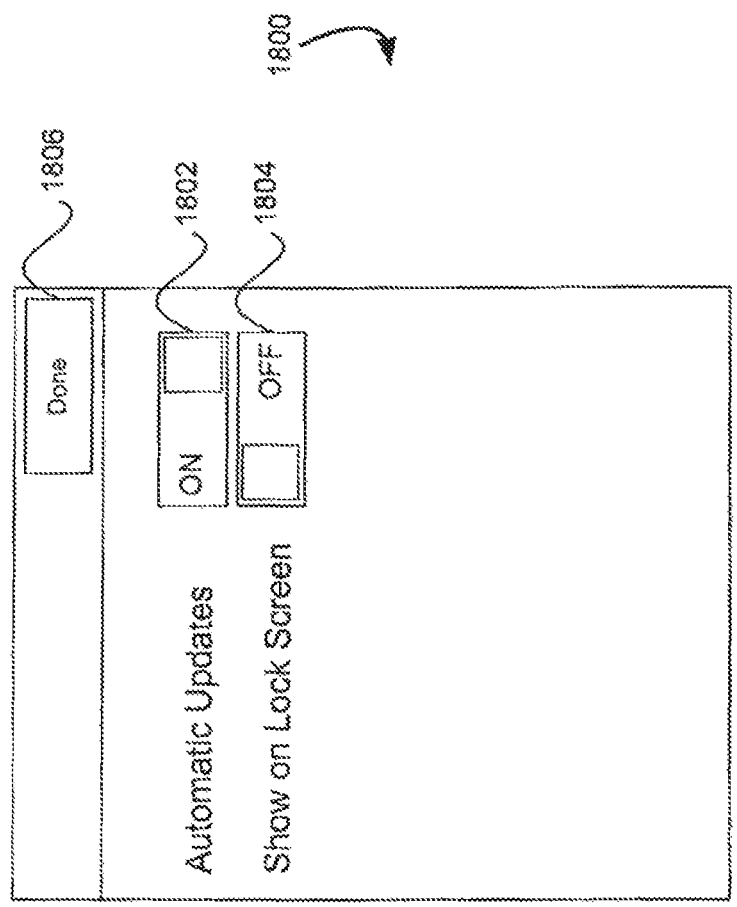
FIG. 18 illustrates an example graphical interface for specifying document options.

FIG. 18 illustrates an example graphical interface 1800 for specifying document options. For example, graphical interface 1800 can be invoked and displayed when a user selects graphical element 1208 of FIGS. 12-17. Graphical interface 1800 can include graphical element 1802 for turning on/off automatic document updates. For example, if a user turns on automatic document updates, the mobile device will receive notifications from the vendor when information associated with the associated document changes. The mobile device can then update the document information associated with the document and present the information on one of the user interfaces described above. For example, the updated information can be highlighted to reflect what information has changed. If the user turns off automatic document updates, automatic document will not be received. For example, the user will have to perform some action with respect to the document (e.g., cause the document to be displayed) for document updates to be received.

Graphical interface 1800 can include graphical element 1804 for specifying whether the document should be presented on the lock screen (e.g., graphical interface 300) of the mobile device. For example, the user can select graphical element 1804 to turn lock screen document notifications off. When the user turns off lock screen notifications, document notifications will not be displayed on the lock screen of the mobile device. The user can select graphical element 1804 to turn lock screen document notifications on. When the user turns on lock screen notifications, document notifications will be displayed on the mobile device, as described with reference to FIG. 3.

Figure 19:
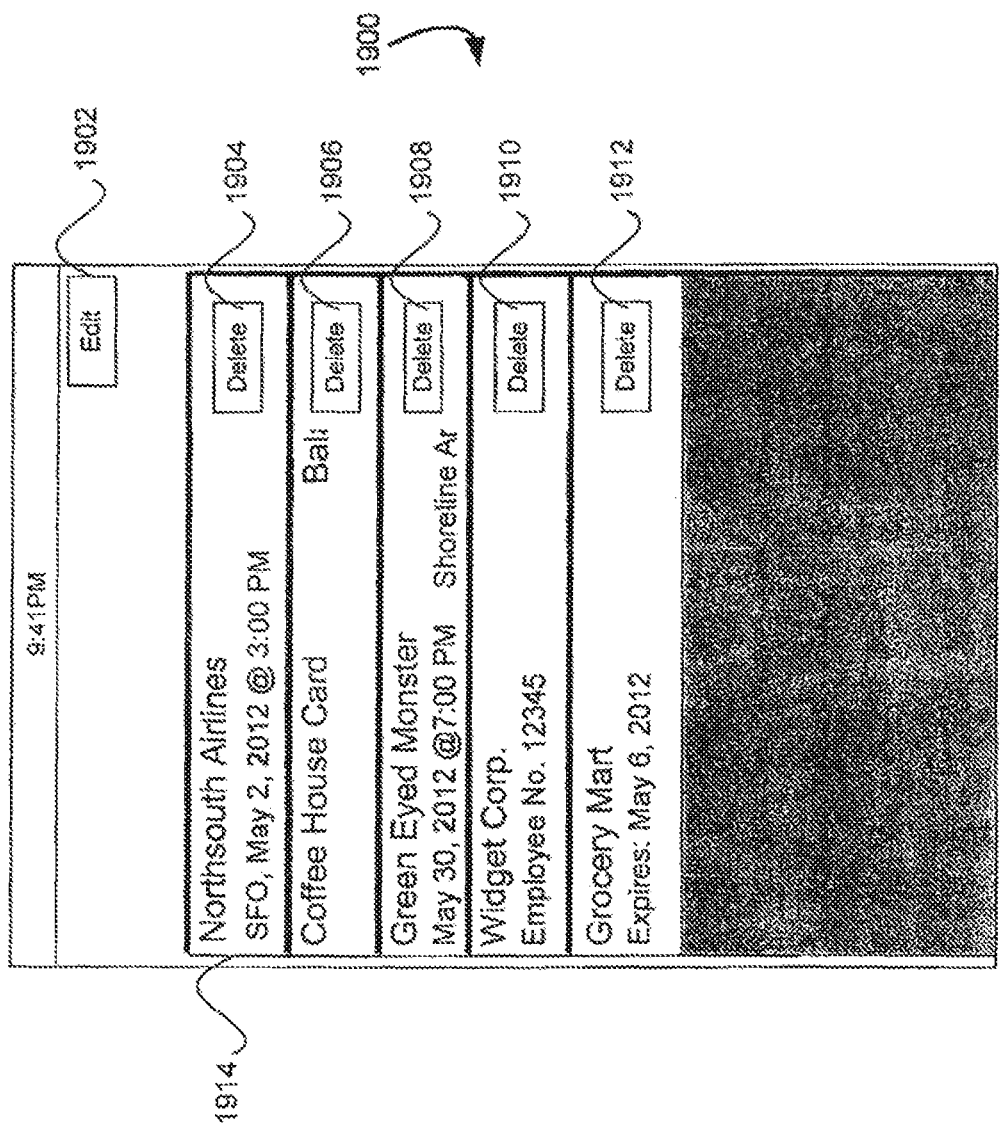
FIG. 19 illustrates an example graphical interface for deleting documents from the mobile device.

FIG. 19 illustrates an example graphical interface 1900 for deleting documents from the mobile device. For example, graphical interface 1900 can correspond to graphical interface 500 of FIG. 5. Graphical interface 1900 can include graphical element 1902 for invoking an edit mode for graphical interface 1900. For example, a user can select graphical element 1902 to cause graphical elements 1904-1912 (e.g., delete buttons) to be displayed. Alternatively, the user can provide input in the form of a touch gesture (e.g., a swipe gesture) across an individual document to enable editing of a particular document. For example, a user can perform a swipe gesture across document abstract 1914 to cause graphical element 1904 to appear. The user can select graphical element 1902 again to cause graphical elements 1904-1912 to disappear from display. The user can provide touch input (e.g., a tap) to graphical interface 1900 on an area that is not associated with graphical elements 1904-1912 to cause graphical elements 1904-1912 to be removed from display. In some implementations, a user can select one of graphical elements 1904-1912 to cause the corresponding document to be deleted.

Figure 20:
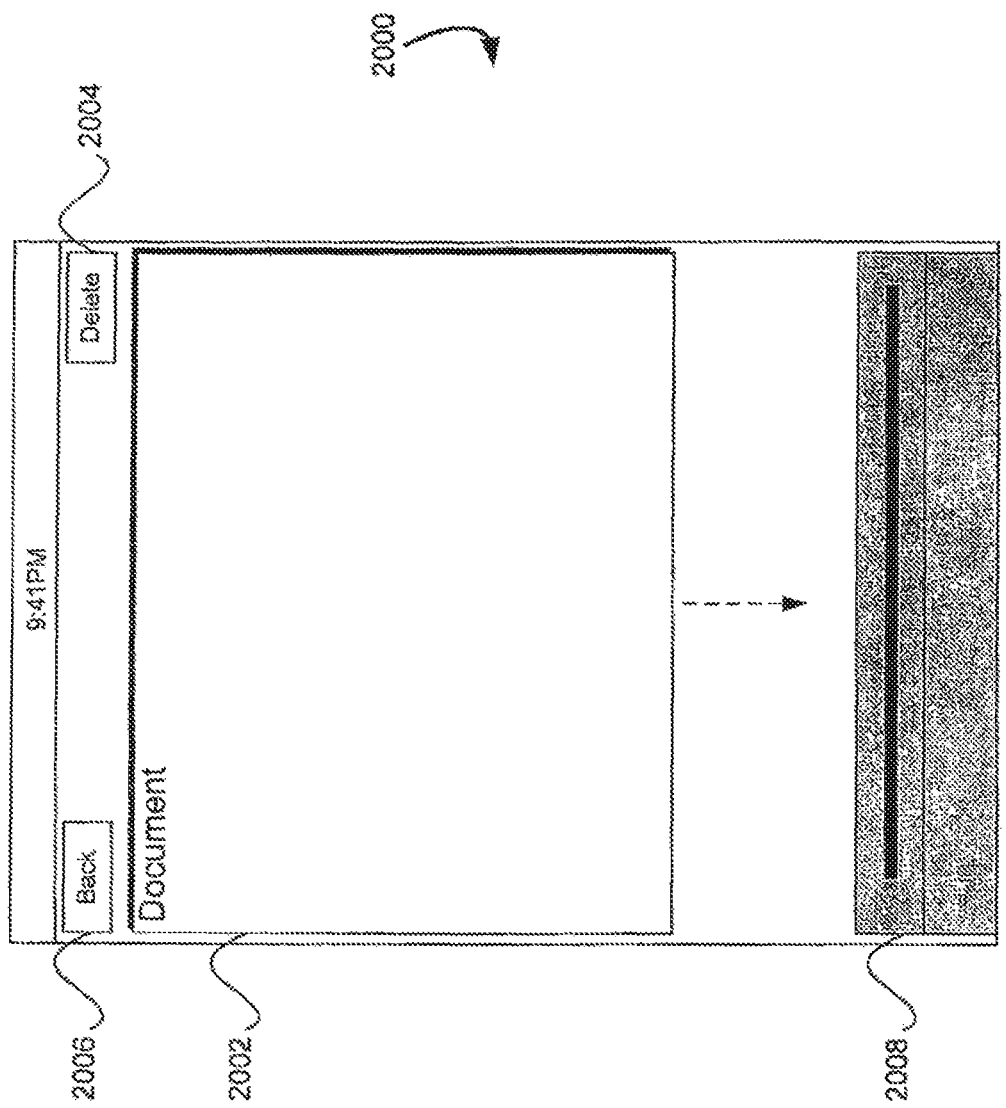
FIG. 20 illustrates an example graphical interface for deleting a document.

FIG. 20 illustrates an example graphical interface 2000 for deleting a document. For example, graphical element can be invoked by selecting a graphical element 1904-1912 of FIG. 19. Graphical interface 2000 can display document 2002 which can correspond to the document selected for deletion in graphical interface 1900 of FIG. 19. The user can delete document 2002 by selecting graphical element 2004. The user can cancel the deletion of document 2002 by selecting graphical element 2006.

In some implementations, when a user selects to delete a document, an animation can be presented. For example, a document shredder animation can be presented where document 2002 moves across graphical interface 200 and appears to enter graphical element 2008. For example, graphical element 2008 can have the appearance of a document shredder. As document 2002 enters graphical element 2008, document 2002 can appear to be shredded into strips or small pieces of paper, thereby simulating the destruction of document 2002. In some implementations, presentation of the document shredder animation can be accompanied by vibration of the mobile device.

In some implementations, when document 2002 is deleted a fire animation can be displayed. For example, the animation can cause document 2002 to appear to be set on fire and document 2002 can appear to be consumed by the fire. Ashes from the document fire can fall from document 2002 as it burns and disappear off the bottom of graphical interface 200. In some implementations, other document destruction animations (e.g., explosions, crumpling into a ball, dropping in a waste basket, tearing into pieces, etc.) can be presented.

Example Process

Figure 21:
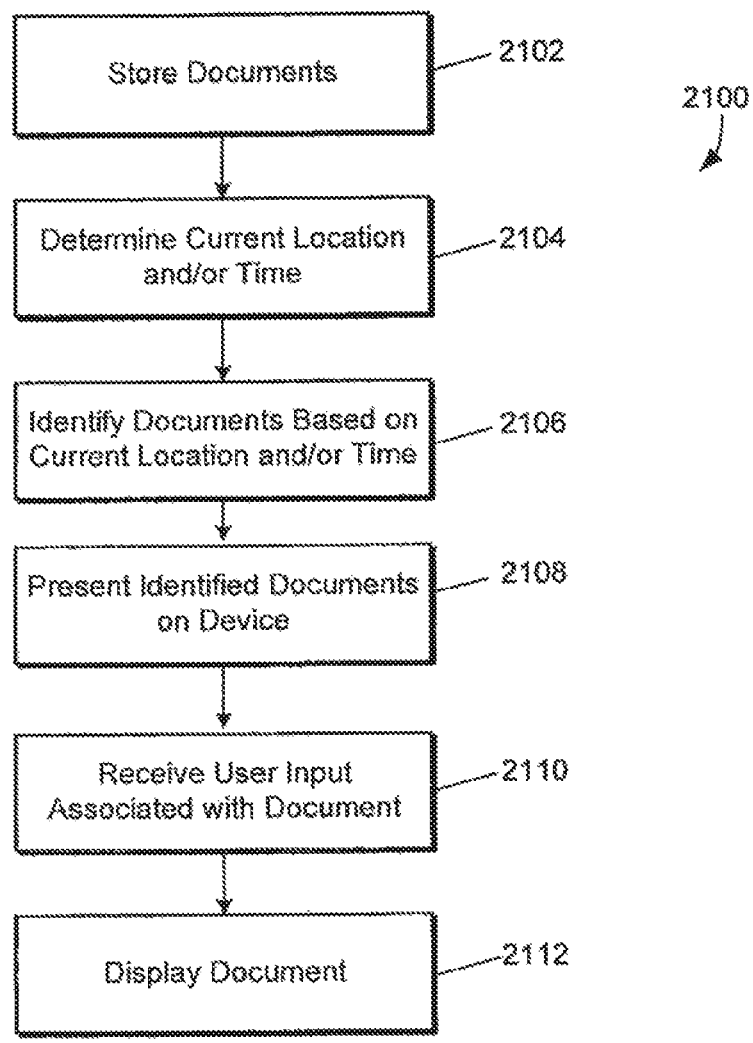
FIG. 21 is flow diagram of an example process for intelligently presenting document notifications on a mobile device.

FIG. 21 is flow diagram of an example process 2100 for intelligently presenting document notifications on a mobile device. At step 2102, documents can be stored on a mobile device. For example, the mobile device can store documents corresponding to boarding passes, customer loyalty cards, identification cards, event tickets, key cards, credit cards and/or any other type of document.

At step 2104, the current location of the mobile device and/or the current time can be determined. For example, the current location of the mobile device can be determined based on GNSS data, sensor data, wireless communication data or any other type of data that can be used to derive a geographic location of the mobile device. The current time can be determined based on a clock of the mobile device.

At step 2106, documents can be identified based on the current location and/or time. For example, each document can be associated with one or more locations. A customer loyalty card document can be associated with a business that has multiple store locations. The store locations can be downloaded with the document to the mobile device. In some implementations, only the store locations proximate (e.g., within 1 mile, within 5 miles, etc.) will be stored on the mobile device. The mobile device can use the store location information to identify documents associated with locations proximate to the mobile device. In some implementations, documents can be associated with a time (e.g., date and time). For example, documents can have expiration dates. The mobile device can use the date and/or time information associated with the document to identify documents associated with dates and/or times that are close to the current time.

In some implementations, documents can be identified based on a pattern of usage. For example, the mobile device can track when and/or where a document is most often used by the user. When the mobile device determines that the current location of the mobile device is at a location corresponding to frequent use of the document, the mobile device can present a document notification allowing the user to quickly access the document at the location. Similarly, when the mobile device determines that the current time corresponds to a time when the document is frequently used, the mobile device can present a document notification allowing the user to quickly access the document.

At step 2108, the identified documents can be presented on a display of the mobile device. When the mobile device is near a location associated with a document, a document notification can be presented on the display of the mobile device. As the current time nears the date/time associated with a document, a document notification can be presented on the display of the mobile device. In some implementations, the identified documents can be presented on a lock screen of the mobile device. For example, document notifications corresponding to the identified documents can be displayed on the lock screen of the mobile device so that the user can quickly access the documents from the lock screen interface.

At step 2110, user input associated with a document can be received. For example a user can select a document notification that has been presented on the lock screen of the mobile device to cause the corresponding document to be displayed at step 2112. Additional details of process 2100 are described with reference to FIGS. 1-20 above.

Figure 22:
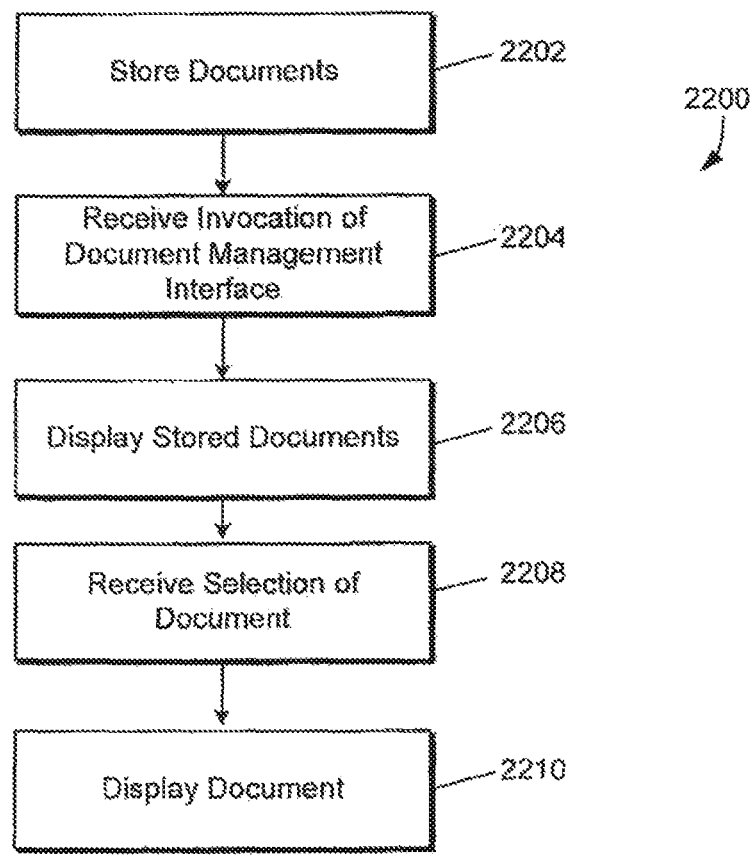
FIG. 22 is flow diagram of an example process for presenting documents on a mobile device.

FIG. 22 is flow diagram of an example process 2200 for presenting documents on a mobile device. At step 2202, documents can be stored on a mobile device. For example, the mobile device can store documents corresponding to boarding passes, customer loyalty cards, identification cards, event tickets, key cards, credit cards and/or any other type of document.

At step 2204, the mobile device can receive an invocation of a document management interface. For example, the user can invoke a document management application on the mobile device to view the documents that are stored on the mobile device. At step 2206, the mobile device can display the stored documents. For example, the mobile device can display the documents as described above with reference to FIGS. 3-19.

At step 2208, the mobile device can receive a selection of a document. For example, the user can provide input selecting a document abstract to cause the mobile device to present a full view of the associated document at step 2210. Additional details of process 2200 are described with reference to FIGS. 1-20 above.

Figure 23:
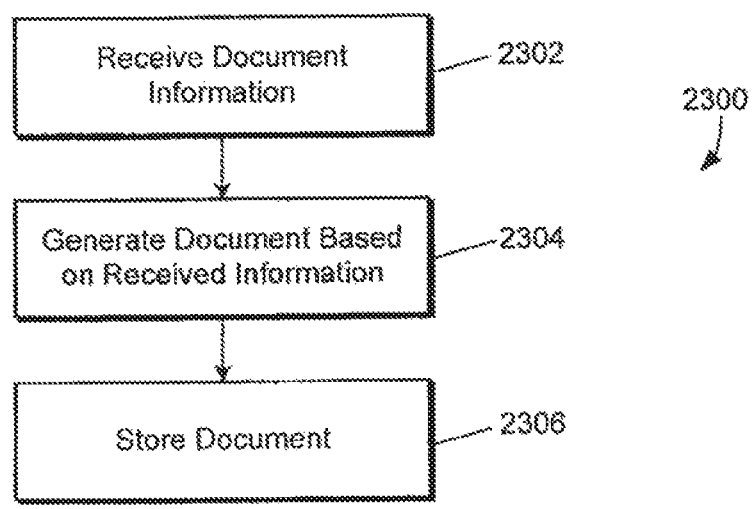
FIG. 23 is flow diagram of an example process for receiving and storing documents on a mobile device.

FIG. 23 is flow diagram of an example process 2300 for receiving and storing documents on a mobile device. At step 2302, document information can be received by the mobile device. For example, the mobile device can receive document information from a website through a browser. The mobile device can receive document information from vendor server through a client application stored on the mobile device. The mobile device can receive document information by email. The mobile device can receive document information through wireless transmission (e.g., near-field communication, Bluetooth, Wi-Fi, etc.). The mobile device can receive document information through an ad-hoc (e.g., device to device) network connection, for example.

The document information can be generated and transmitted as a result of a transaction between a user of the device and a document vendor. The transaction can be a purchase transaction. For example, the use can purchase a boarding pass, event ticket, or other document. The transaction can be a subscription transaction. For example, the user can subscribe to a customer loyalty program. Once the transaction is complete, the vendor can transmit the document information to the user.

At step 2304, a document can be generated based on the received document information. In some implementations, the document information can include all of the information necessary for generating a document on the mobile device. For example, the vendor-provided document information can include all of the information needed to identify a document template and populate the document template with data. In some implementations, the document information can include only a minimum amount of information needed to retrieve the full set of document information from a vendor server. For example, the minimum amount of information can include a transaction identifier, account identifier, user identifier, or other information that can be used to retrieve document information from the vendor's server. Once the identifier (e.g., transaction identifier) is received, the mobile device can access the vendor's server and download the complete information for the document. Once the mobile device has a complete set of document information, the mobile device can generate the document. The document can then be stored on the mobile device at step 2306. Additional details of process 2300 are described with reference to FIGS. 1-20 above.

Example System Architecture

Figure 24:
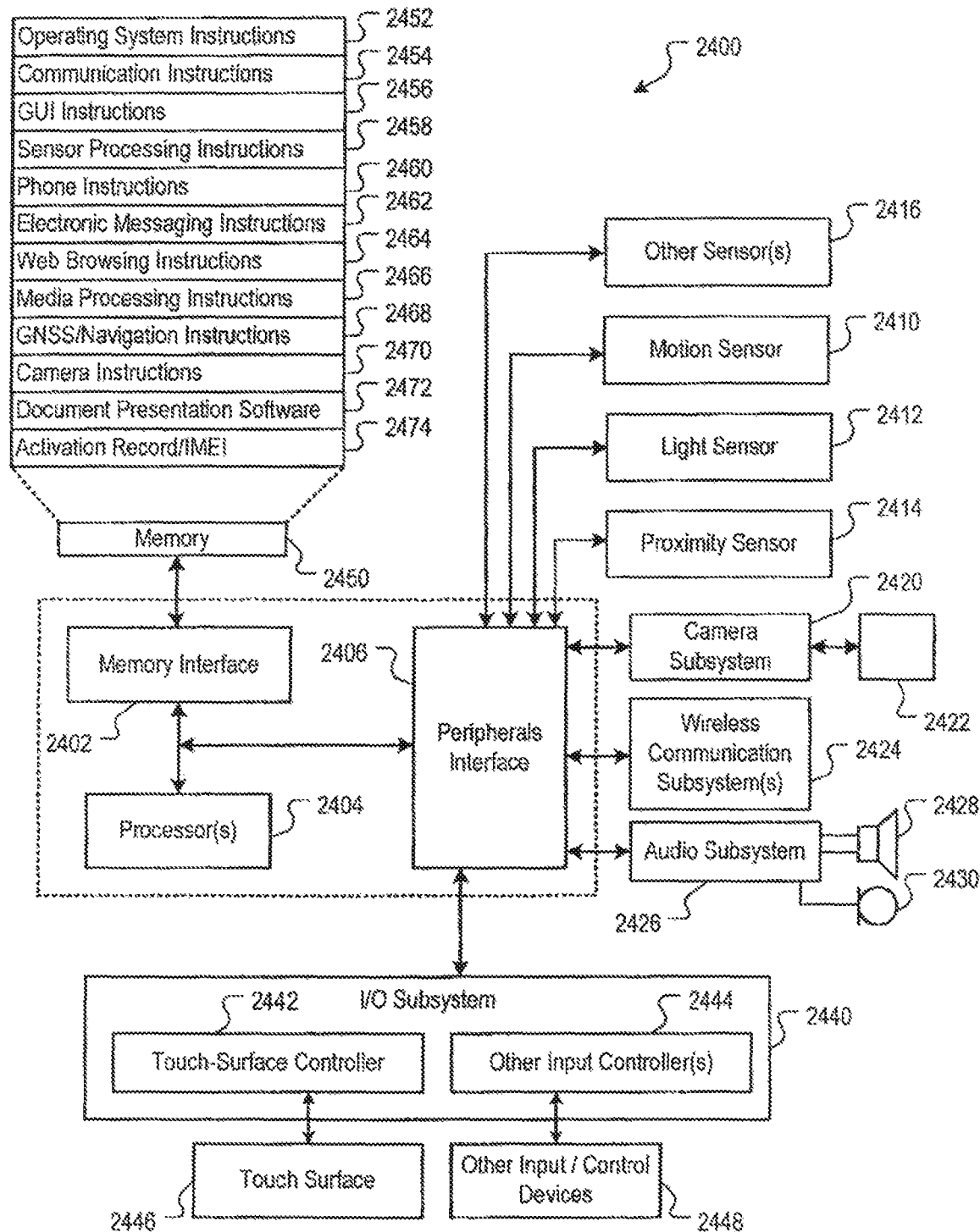
FIG. 24 is a block diagram of an exemplary system architecture implementing the features and processes of FIGS. 1-23.

FIG. 24 is a block diagram of an example computing device 2400 that can implement the features and processes of FIGS. 1-23. The computing device 2400 can include a memory interface 2402, one or more data processors, image processors and/or central processing units 2404, and a peripherals interface 2406. The memory interface 2402, the one or more processors 2404 and/or the peripherals interface 2406 can be separate components or can be integrated in one or more integrated circuits. The various components in the computing device 2400 can be coupled by one or more communication buses or signal lines.

Sensors, devices, and subsystems can be coupled to the peripherals interface 2406 to facilitate multiple functionalities. For example, a motion sensor 2410, a light sensor 2412, and a proximity sensor 2414 can be coupled to the peripherals interface 2406 to facilitate orientation, lighting, and proximity functions. Other sensors 2416 can also be connected to the peripherals interface 2406, such as a global navigation satellite system (GNSS) (e.g., GPS receiver), a temperature sensor, a biometric sensor, or other sensing device, to facilitate related functionalities.

A camera subsystem 2420 and an optical sensor 2422, e.g., a charged coupled device (CCD) or a complementary metal-oxide semiconductor (CMOS) optical sensor, can be utilized to facilitate camera functions, such as recording photographs and video clips. The camera subsystem 2420 and the optical sensor 2422 can be used to collect images of a user to be used during authentication of a user, e.g., by performing facial recognition analysis.

Communication functions can be facilitated through one or more wireless communication subsystems 2424, which can include radio frequency receivers and transmitters and/or optical (e.g., infrared) receivers and transmitters. The specific design and implementation of the communication subsystem 2424 can depend on the communication network(s) over which the computing device 2400 is intended to operate. For example, the computing device 2400 can include communication subsystems 2424 designed to operate over a GSM network, a GPRS network, an EDGE network, a Wi-Fi or WiMax network, and a Bluetooth™ network. In particular, the wireless communication subsystems 2424 can include hosting protocols such that the device 100 can be configured as a base station for other wireless devices.

An audio subsystem 2426 can be coupled to a speaker 2428 and a microphone 2430 to facilitate voice-enabled functions, such as speaker recognition, voice replication, digital recording, and telephony functions. The audio subsystem 2426 can be configured to facilitate processing voice commands for invoking the features and processes described above with reference to FIGS. 1-23.

The I/O subsystem 2440 can include a touch-surface controller 2442 and/or other input controller(s) 2444. The touch-surface controller 2442 can be coupled to a touch surface 2446. The touch surface 2446 and touch-surface controller 2442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2446.

The other input controller(s) 2444 can be coupled to other input/control devices 2448, such as one or more buttons, rocker switches, thumb-wheel, infrared port, USB port, and/or a pointer device such as a stylus. The one or more buttons (not shown) can include an up/down button for volume control of the speaker 2428 and/or the microphone 2430.

In one implementation, a pressing of the button for a first duration can disengage a lock of the touch surface 2446; and a pressing of the button for a second duration that is longer than the first duration can turn power to the computing device 2400 on or off. Pressing the button for a third duration can activate a voice control, or voice command, module that enables the user to speak commands into the microphone 2430 to cause the device to execute the spoken command. The user can customize a functionality of one or more of the buttons. The touch surface 2446 can, for example, also be used to implement virtual or soft buttons and/or a keyboard.

In some implementations, the computing device 2400 can present recorded audio and/or video files, such as MP3, AAC, and MPEG files. In some implementations, the computing device 2400 can include the functionality of an MP3 player, such as an iPod™. The computing device 2400 can, therefore, include a 36-pin connector that is compatible with the iPod. Other input/output and control devices can also be used.

The memory interface 2402 can be coupled to memory 2450. The memory 2450 can include high-speed random access memory and/or non-volatile memory, such as one or more magnetic disk storage devices, one or more optical storage devices, and/or flash memory (e.g., NAND, NOR). The memory 2450 can store an operating system 2452, such as Darwin, RTXC, LINUX, UNIX, OS X, WINDOWS, or an embedded operating system such as VxWorks.

The operating system 2452 can include instructions for handling basic system services and for performing hardware dependent tasks. In some implementations, the operating system 2452 can be a kernel (e.g., UNIX kernel). In some implementations, the operating system 2452 can include instructions for intelligent presentation of documents. For example, operating system 2452 can implement the document notification features as described with reference to FIGS. 1-23.

The memory 2450 can also store communication instructions 2454 to facilitate communicating with one or more additional devices, one or more computers and/or one or more servers. The memory 2450 can include graphical user interface instructions 2456 to facilitate graphic user interface processing; sensor processing instructions 2458 to facilitate sensor-related processing and functions; phone instructions 2460 to facilitate phone-related processes and functions; electronic messaging instructions 2462 to facilitate electronic-messaging related processes and functions; web browsing instructions 2464 to facilitate web browsing-related processes and functions; media processing instructions 2466 to facilitate media processing-related processes and functions; GNSS/Navigation instructions 2468 to facilitate GNSS and navigation-related processes and instructions; and/or camera instructions 2470 to facilitate camera-related processes and functions.

The memory 2450 can store other software instructions 2472 to facilitate other processes and functions, such as the security and/or authentication processes and functions as described with reference to FIGS. 1-23. For example, the software instructions can include instructions for receiving, generating, storing and presenting documents as described above with reference to FIGS. 1-23.

The memory 2450 can also store other software instructions (not shown), such as web video instructions to facilitate web video-related processes and functions; and/or web shopping instructions to facilitate web shopping-related processes and functions. In some implementations, the media processing instructions 2466 are divided into audio processing instructions and video processing instructions to facilitate audio processing-related processes and functions and video processing-related processes and functions, respectively. An activation record and International Mobile Equipment Identity (IMEI) 2474 or similar hardware identifier can also be stored in memory 2450.

Each of the above identified instructions and applications can correspond to a set of instructions for performing one or more functions described above. These instructions need not be implemented as separate software programs, procedures, or modules. The memory 2450 can include additional instructions or fewer instructions. Furthermore, various functions of the computing device 2400 can be implemented in hardware and/or in software, including in one or more signal processing and/or application specific integrated circuits.

Therefore, according to the above, some examples of the disclosure are directed to a method comprising: storing one or more documents on a computing device; determining a context of the computing device; based on the context, identifying at least one of the one or more documents to present on a display of the computing device; and presenting the at least one identified document on a display of the computing device. Additionally or alternatively to one or more of the examples disclosed above, in some examples determining a context of the computing device comprises determining a current time, and the method further comprising: comparing the current time to one or more preconfigured times associated with the one or more documents, where each document is associated with at least one preconfigured time; and identifying the at least one identified document based on the comparison. Additionally or alternatively to one or more of the examples disclosed above, in some examples determining a context of the computing device comprises determining a current location of the computing device, and the method further comprising: comparing the current location to one or more preconfigured locations associated with the one or more documents, where each document is associated with at least one preconfigured location; and identifying the at least one identified document based on the comparison. Additionally or alternatively to one or more of the examples disclosed above, in some examples presenting the at least one identified document comprises presenting the at least one identified document on a display of the computing device when the device is in a locked state. Additionally or alternatively to one or more of the examples disclosed above, in some examples presenting the at least one identified document comprises presenting an abstract of the at least one identified document on a display of the computing device. Additionally or alternatively to one or more of the examples disclosed above, in some examples the method further comprises receiving user input selecting the at least one identified document; and presenting an optical machine-readable representation of data associated with the at least one identified document on the display of the computing device. Additionally or alternatively to one or more of the examples disclosed above, in some examples the document corresponds to a ticket to an event. Additionally or alternatively to one or more of the examples disclosed above, in some examples the document corresponds to a boarding pass. Additionally or alternatively to one or more of the examples disclosed above, in some examples the document corresponds to a business loyalty document. Additionally or alternatively to one or more of the examples disclosed above, in some examples the document corresponds to an identification document associated with a user of the computing device. Additionally or alternatively to one or more of the examples disclosed above, in some examples the document corresponds to a coupon.

Some examples of the disclosure are directed to a method comprising: storing a plurality of documents on a mobile device; presenting abstracts associated with the plurality of documents on a display of the mobile device; receiving, from a user, a selection of an abstract corresponding to a particular one of the plurality of documents; and in response to receiving the selection, presenting the particular document on the display of the mobile device. Additionally or alternatively to one or more of the examples disclosed above, in some examples presenting the abstracts associated with the plurality of documents comprises presenting the documents in an overlapping presentation. Additionally or alternatively to one or more of the examples disclosed above, in some examples presenting the particular document comprises presenting an animation that causes the plurality of documents that were not selected to move to the edge of the display. Additionally or alternatively to one or more of the examples disclosed above, in some examples presenting the particular document comprises presenting an optical machine-readable representation of data associated with the particular document on the display of the mobile device. Additionally or alternatively to one or more of the examples disclosed above, in some examples the particular document belongs to a group of associated documents and presenting the particular document comprises presenting one of the documents in the group; and the method further comprises: while the particular document is presented, receiving input for displaying another document in the group of associated documents; and presenting another document in the group on the display of the mobile device. Additionally or alternatively to one or more of the examples disclosed above, in some examples the display is a touch-sensitive display and the input for displaying another document comprises touch input to the touch-sensitive display. Additionally or alternatively to one or more of the examples disclosed above, in some examples the method further comprises receiving input for deleting the particular document; and presenting an animation that appears to shred the particular document. Additionally or alternatively to one or more of the examples disclosed above, in some examples the method further comprises causing the mobile device to vibrate while presenting the shredder animation.

Some examples of the disclosure are directed to a non-transitory computer-readable medium including one or more sequences of instructions which, when executed by one or more processors, causes: storing one or more documents on a computing device; determining a context of the computing device; based on the context, identifying at least one of the one or more documents to present on a display of the computing device; and presenting the at least one identified document on a display of the computing device. Additionally or alternatively to one or more of the examples disclosed above, in some examples the instructions that cause determining a context of the computing device comprise instructions that cause determining a current time and wherein the instructions cause: comparing the current time to one or more preconfigured times associated with the one or more documents, where each document is associated with at least one preconfigured time; and identifying the at least one identified document based on the comparison. Additionally or alternatively to one or more of the examples disclosed above, in some examples instructions that cause determining a context of the computing device comprise instructions that cause determining a current location of the computing device and wherein the instructions cause: comparing the current location to one or more preconfigured locations associated with the one or more documents, where each document is associated with at least one preconfigured location; and identifying the at least one identified document based on the comparison. Additionally or alternatively to one or more of the examples disclosed above, in some examples the instructions that cause presenting the at least one identified document comprise instructions that cause presenting the at least one identified document on a display of the computing device when the device is in a locked state. Additionally or alternatively to one or more of the examples disclosed above, in some examples the instructions that cause presenting the at least one identified document comprise instructions that cause presenting an abstract of the at least one identified document on a display of the computing device. Additionally or alternatively to one or more of the examples disclosed above, in some examples the instructions cause: receiving user input selecting the at least one identified document; and presenting an optical machine-readable representation of data associated with the at least one identified document on the display of the computing device. Additionally or alternatively to one or more of the examples disclosed above, in some examples the document corresponds to a ticket to an event. Additionally or alternatively to one or more of the examples disclosed above, in some examples the document corresponds to a boarding pass. Additionally or alternatively to one or more of the examples disclosed above, in some examples the document corresponds to a business loyalty document. Additionally or alternatively to one or more of the examples disclosed above, in some examples the document corresponds to an identification document associated with a user of the computing device. Additionally or alternatively to one or more of the examples disclosed above, in some examples the document corresponds to a coupon.

Some examples of the disclosure are directed to a non-transitory computer-readable medium including one or more sequences of instructions which, when executed by one or more processors, causes: storing a plurality of documents on a mobile device; presenting abstracts associated with the plurality of documents on a display of the mobile device; receiving a selection of an abstract corresponding to a particular one of the plurality of documents; and in response to receiving the selection, presenting the particular document on the display of the mobile device. Additionally or alternatively to one or more of the examples disclosed above, in some examples the instructions that cause presenting the abstracts associated with the plurality of documents comprise instructions that cause presenting the documents in an overlapping presentation. Additionally or alternatively to one or more of the examples disclosed above, in some examples the instructions that cause presenting the particular document comprise instructions that cause presenting an animation that causes the plurality of documents that were not selected to move to the edge of the display. Additionally or alternatively to one or more of the examples disclosed above, in some examples the instructions that cause presenting the particular document comprise instructions that cause presenting an optical machine-readable representation of data associated with the particular document on the display of the mobile device. Additionally or alternatively to one or more of the examples disclosed above, in some examples the particular document belongs to a group of associated documents and the instructions that cause presenting the particular document comprise instructions that cause presenting one of the documents in the group; and wherein the instructions cause: while the particular document is presented, receiving input for displaying another document in the group of associated documents; and presenting another document in the group on the display of the mobile device. Additionally or alternatively to one or more of the examples disclosed above, in some examples the display is a touch-sensitive display and the input for displaying another document comprises touch input to the touch-sensitive display. Additionally or alternatively to one or more of the examples disclosed above, in some examples the instructions cause: receiving input for deleting the particular document; and presenting an animation that appears to shred the particular document. Additionally or alternatively to one or more of the examples disclosed above, in some examples the instructions the mobile device to vibrate while presenting the shredder animation.

Some examples of the disclosure are directed to a system comprising: one or more processors; and a computer-readable medium including one or more sequences of instructions which, when executed by the one or more processors, causes: storing one or more documents on a computing device; determining a context of the computing device; based on the context, identifying at least one of the one or more documents to present on a display of the computing device; and presenting the at least one identified document on a display of the computing device. Additionally or alternatively to one or more of the examples disclosed above, in some examples the instructions that cause determining a context of the computing device comprise instructions that cause determining a current time and wherein the instructions cause: comparing the current time to one or more preconfigured times associated with the one or more documents, where each document is associated with at least one preconfigured time; and identifying the at least one identified document based on the comparison. Additionally or alternatively to one or more of the examples disclosed above, in some examples the instructions that cause determining a context of the computing device comprise instructions that cause determining a current location of the computing device and wherein the instructions cause: comparing the current location to one or more preconfigured locations associated with the one or more documents, where each document is associated with at least one preconfigured location; and identifying the at least one identified document based on the comparison. Additionally or alternatively to one or more of the examples disclosed above, in some examples the instructions that cause presenting the at least one identified document comprise instructions that cause presenting the at least one identified document on a display of the computing device when the device is in a locked state. Additionally or alternatively to one or more of the examples disclosed above, in some examples the instructions that cause presenting the at least one identified document comprise instructions that cause presenting an abstract of the at least one identified document on a display of the computing device. Additionally or alternatively to one or more of the examples disclosed above, in some examples the instructions cause: receiving user input selecting the at least one identified document; and presenting an optical machine-readable representation of data associated with the at least one identified document on the display of the computing device. Additionally or alternatively to one or more of the examples disclosed above, in some examples the document corresponds to a ticket to an event. Additionally or alternatively to one or more of the examples disclosed above, in some examples the document corresponds to a boarding pass. Additionally or alternatively to one or more of the examples disclosed above, in some examples the document corresponds to a business loyalty document. Additionally or alternatively to one or more of the examples disclosed above, in some examples the document corresponds to an identification document associated with a user of the computing device. Additionally or alternatively to one or more of the examples disclosed above, in some examples the document corresponds to a coupon.

Some examples of the disclosure are directed to a system comprising: one or more processors; and a computer-readable medium including one or more sequences of instructions which, when executed by the one or more processors, causes: storing a plurality of documents on a mobile device; presenting abstracts associated with the plurality of documents on a display of the mobile device; receiving a selection of an abstract corresponding to a particular one of the plurality of documents; and in response to receiving the selection, presenting the particular document on the display of the mobile device. Additionally or alternatively to one or more of the examples disclosed above, in some examples the instructions that cause presenting the abstracts associated with the plurality of documents comprise instructions that cause presenting the documents in an overlapping presentation. Additionally or alternatively to one or more of the examples disclosed above, in some examples the instructions that cause presenting the particular document comprise instructions that cause presenting an animation that causes the plurality of documents that were not selected to move to the edge of the display. Additionally or alternatively to one or more of the examples disclosed above, in some examples the instructions that cause presenting the particular document comprise instructions that cause presenting an optical machine-readable representation of data associated with the particular document on the display of the mobile device. Additionally or alternatively to one or more of the examples disclosed above, in some examples the particular document belongs to a group of associated documents and the instructions that cause presenting the particular document comprise instructions that cause presenting one of the documents in the group; and wherein the instructions cause: while the particular document is presented, receiving input for displaying another document in the group of associated documents; and presenting another document in the group on the display of the mobile device. Additionally or alternatively to one or more of the examples disclosed above, in some examples the display is a touch-sensitive display and the input for displaying another document comprises touch input to the touch-sensitive display. Additionally or alternatively to one or more of the examples disclosed above, in some examples the instructions cause: receiving input for deleting the particular document; and presenting an animation that appears to shred the particular document. Additionally or alternatively to one or more of the examples disclosed above, in some examples the instructions cause the mobile device to vibrate while presenting the shredder animation. Additionally or alternatively to one or more of the examples disclosed above, in some examples the method further comprises: in response to receiving the selection, biometrically verifying that the user is an authorized user of the particular document; and presenting the particular document on the display of the mobile device when the user is verified to be an authorized user of the particular document. Additionally or alternatively to one or more of the examples disclosed above, in some examples biometrically verifying the user comprises: capturing a fingerprint of the user at a time proximate to receiving the selection; and comparing the captured fingerprint to a authenticated fingerprint of an authorized user of the particular document. Additionally or alternatively to one or more of the examples disclosed above, in some examples biometrically verifying the user comprises: capturing an image of the user at a time proximate to receiving the selection; and comparing the captured image to a authenticated image of an authorized user of the particular document.

What is claimed is:

1. A method comprising:
    at an electronic device in communication with a display device and one or more input devices:
    receiving, via the one or more input devices, user input storing a plurality of documents on the electronic device;
    after storing the plurality of documents on the electronic device including a first document and a second document, and while displaying, in a wake user interface displayed via the display device, a first portion of a representation of the first document and not a second portion, different from the first portion, of the representation of the first document, receiving user input corresponding to a request to select the first document for use in a subsequent transaction, wherein the user input includes selection of the first portion of the representation of the first document, and the wake user interface is displayed by the electronic device in response to waking from a low power state; and
    in response to receiving the user input corresponding to the request to select the first document for use in a subsequent transaction:
        displaying, via the display device, the first and second portions of the representation of the first document;
        while displaying the first and second portions of the representation of the first document via the display device, receiving authentication information from a user of the electronic device; and
        in response to receiving the authentication information, in accordance with a determination that the authentication information indicates that the user is authorized to use the first document in the transaction, allowing the first document to be used in the transaction, including making information associated with the first document available for wireless communication to a second electronic device participating in the transaction.

2. The method of claim 1, wherein the first document corresponds to a document of a first type, and the second document corresponds to a document of a second type, different from the first type.

3. The method of claim 2, wherein the first document corresponds to a credit card, and the second document corresponds to a customer loyalty card.

4. The method of claim 1, wherein the first document corresponds to a first credit card, and the second document corresponds to a second credit card, different from the first credit card.

5. The method of claim 1, further comprising:

before receiving the user input corresponding to the request to select the first document for use in the subsequent transaction, displaying, on the wake user interface, the first portion of the representation of the first document and a representation of the second document; and in response to receiving the user input corresponding to the request to select the first document for use in the subsequent transaction, modifying the display of the first portion of the representation of the first document and the representation of the second document to indicate that the first document was selected, and the second document was not selected.

6. The method of claim 5, wherein modifying the display of the representation of the second document comprises ceasing display of the representation of the second document.

7. The method of claim 5, wherein the first portion of the representation of the first document includes information about the first document, and the representation of the second document includes information about the second document.

8. The method of claim 1, wherein the transaction comprises a purchase transaction using the first document.

9. The method of claim 1, wherein requiring authentication of the user of the electronic device comprises requiring entry of a code on the electronic device.

10. The method of claim 9, wherein the code comprises an unlock code for the electronic device.

11. The method of claim 1, wherein the authentication information comprises biometric authentication information of the user of the electronic device.

12. The method of claim 11, wherein the biometric authentication information of the user comprises fingerprint authentication information of the user.

13. The method of claim 11, wherein the biometric authentication information of the user comprises facial authentication information of the user.

14. The method of claim 1, further comprising:
before receiving the user input corresponding to the request to select the first document for use in the subsequent transaction, displaying, on the wake user interface, the first portion of the representation of the first document and a representation of the second document.

15. A non-transitory computer readable storage medium storing one or more programs, the one or more programs comprising instructions, which when executed by one or more processors of an electronic device in communication with a display device and one or more input devices, cause the electronic device to perform a method comprising:
receiving, via the one or more input devices, user input storing a plurality of documents on the electronic device;
after storing the plurality of documents on the electronic device including a first document and a second document, and while displaying, in a wake user interface displayed via the display device, a first portion of a representation of the first document and not a second portion, different from the first portion, of the representation of the first document, receiving user input corresponding to a request to select the first document for use in a subsequent transaction, wherein the user input includes selection of the first portion of the representation of the first document, and the wake user interface is displayed by the electronic device in response to waking from a low power state; and in response to receiving the user input corresponding to the request to select the first document for use in a subsequent transaction:
displaying, via the display device, the first and second portions of the representation of the first document;
while displaying the first and second portions of the representation of the first document via the display device, receiving authentication information from a user of the electronic device; and
in response to receiving the authentication information, in accordance with a determination that the authentication information indicates that the user is authorized to use the first document in the transaction, allowing the first document to be used in the transaction, including making information associated with the first document available for wireless communication to a second electronic device participating in the transaction.

16. The non-transitory computer readable storage medium of claim 15, wherein the first document corresponds to a document of a first type, and the second document corresponds to a document of a second type, different from the first type.

17. The non-transitory computer readable storage medium of claim 16, wherein the first document corresponds to a credit card, and the second document corresponds to a customer loyalty card.

18. The non-transitory computer readable storage medium of claim 15, wherein the first document corresponds to a first credit card, and the second document corresponds to a second credit card, different from the first credit card.

19. The non-transitory computer readable storage medium of claim 15, the method further comprising:
before receiving the user input corresponding to the request to select the first document for use in the subsequent transaction, displaying, on the wake user interface, the first portion of the representation of the first document and a representation of the second document; and in response to receiving the user input corresponding to the request to select the first document for use in the subsequent transaction, modifying the display of the first portion of the representation of the first document and the representation of the second document to indicate that the first document was selected, and the second document was not selected.

20. The non-transitory computer readable storage medium of claim 19, wherein modifying the display of the representation of the second document comprises ceasing display of the representation of the second document.

21. The non-transitory computer readable storage medium of claim 19, wherein the first portion of the representation of the first document includes information about the first document, and the representation of the second document includes information about the second document.

22. The non-transitory computer readable storage medium of claim 15, wherein the transaction comprises a purchase transaction using the first document.

23. The non-transitory computer readable storage medium of claim 15, wherein requiring authentication of the user of the electronic device comprises requiring entry of a code on the electronic device.

24. The non-transitory computer readable storage medium of claim 23, wherein the code comprises an unlock code for the electronic device.

25. The non-transitory computer readable storage medium of claim 15, wherein the authentication information comprises biometric authentication information of the user of the electronic device.

26. The non-transitory computer readable storage medium of claim 25, wherein the biometric authentication information of the user comprises fingerprint authentication information of the user.

27. The non-transitory computer readable storage medium of claim 25, wherein the biometric authentication information of the user comprises facial authentication information of the user.

28. The non-transitory computer readable storage medium of claim 15, the method further comprising:
before receiving the user input corresponding to the request to select the first document for use in the subsequent transaction, displaying, on the wake user interface, the first portion of the representation of the first document and a representation of the second document.

29. An electronic device, comprising:
one or more processors;
memory; and
one or more programs, wherein the one or more programs are stored in the memory and configured to be executed by the one or more processors to cause the electronic device to perform a method comprising:
receiving, via one or more input devices, user input storing a plurality of documents on the electronic device;
after storing the plurality of documents on the electronic device including a first document and a second document, and while displaying, in a wake user interface displayed via a display device, a first portion of a representation of the first document and not a second portion, different from the first portion, of the representation of the first document, receiving user input corresponding to a request to select the first document for use in a subsequent transaction, wherein the user input includes selection of the first portion of the representation of the first document, and the wake user interface is displayed by the electronic device in response to waking from a low power state; and
in response to receiving the user input corresponding to the request to select the first document for use in a subsequent transaction:
displaying, via the display device, the first and second portions of the representation of the first document;
while displaying the first and second portions of the representation of the first document via the display device, receiving authentication information from a user of the electronic device; and
in response to receiving the authentication information, in accordance with a determination that the authentication information indicates that the user is authorized to use the first document in the transaction, allowing the first document to be used in the transaction, including making information associated with the first document available for wireless communication to a second electronic device participating in the transaction.

30. The electronic device of claim 29, wherein the first document corresponds to a document of a first type, and the second document corresponds to a document of a second type, different from the first type.

31. The electronic device of claim 30, wherein the first document corresponds to a credit card, and the second document corresponds to a customer loyalty card.

32. The electronic device of claim 29, wherein the first document corresponds to a first credit card, and the second document corresponds to a second credit card, different from the first credit card.

33. The electronic device of claim 29, the method further comprising:
before receiving the user input corresponding to the request to select the first document for use in the subsequent transaction, displaying, on the wake user interface, the first portion of the representation of the first document and a representation of the second document; and
in response to receiving the user input corresponding to the request to select the first document for use in the subsequent transaction, modifying the display of the first portion of the representation of the first document and the representation of the second document to indicate that the first document was selected, and the second document was not selected.

34. The electronic device of claim 33, wherein modifying the display of the representation of the second document comprises ceasing display of the representation of the second document.

35. The electronic device of claim 33, wherein the first portion of the representation of the first document includes information about the first document, and the representation of the second document includes information about the second document.

36. The electronic device of claim 29, wherein the transaction comprises a purchase transaction using the first document.

37. The electronic device of claim 29, wherein requiring authentication of the user of the electronic device comprises requiring entry of a code on the electronic device.

38. The electronic device of claim 37, wherein the code comprises an unlock code for the electronic device.

39. The electronic device of claim 29, wherein the authentication information comprises biometric authentication information of the user of the electronic device.

40. The electronic device of claim 39, wherein the biometric authentication information of the user comprises fingerprint authentication information of the user.

41. The electronic device of claim 39, wherein the biometric authentication information of the user comprises facial authentication information of the user.

42. The electronic device of claim 29, the method further comprising:
before receiving the user input corresponding to the request to select the first document for use in the subsequent transaction, displaying, on the wake user interface, the first portion of the representation of the first document and a representation of the second document.

* * * * *